(12) United States Patent
Wyatt et al.

(10) Patent No.: US 10,440,053 B2
(45) Date of Patent: Oct. 8, 2019

(54) METHODS AND SYSTEMS FOR DETECTING AND PREVENTING NETWORK CONNECTION COMPROMISE

(71) Applicant: LOOKOUT, INC., San Francisco, CA (US)

(72) Inventors: Timothy Micheal Wyatt, Toronto (CA); Brian James Buck, Livermore, CA (US); David William Cowden, San Francisco, CA (US); Nitin Shridhar Desai, Dublin, CA (US); Prasad Deshpande, Lexington, MA (US); Robert Blaine Elwell, Atlanta, GA (US)

(73) Assignee: LOOKOUT, INC., San Francisco, CA (US)

( * ) Notice: Subject to any disclaimer, the term of this patent is extended or adjusted under 35 U.S.C. 154(b) by 0 days.

(21) Appl. No.: 15/608,556

(22) Filed: May 30, 2017

(65) Prior Publication Data
US 2017/0346853 A1    Nov. 30, 2017

Related U.S. Application Data

(60) Provisional application No. 62/343,748, filed on May 31, 2016.

(51) Int. Cl.
*H04L 29/06* (2006.01)
*H04L 12/26* (2006.01)
(Continued)

(52) U.S. Cl.
CPC .......... *H04L 63/1466* (2013.01); *G06F 21/56* (2013.01); *G06F 21/577* (2013.01);
(Continued)

(58) Field of Classification Search
CPC . H04L 67/42; H04L 63/1466; H04L 63/1425; H04L 43/12; H04L 63/0884
See application file for complete search history.

(56) References Cited

U.S. PATENT DOCUMENTS

| | | | |
|---|---|---|---|
| 5,715,518 A | 2/1998 | Barrere et al. | |
| 6,044,158 A * | 3/2000 | Terpening | H04K 1/00 380/255 |

(Continued)

FOREIGN PATENT DOCUMENTS

| | | |
|---|---|---|
| CN | 103167488 | 6/2013 |
| WO | WO2008007111 | 1/2008 |

(Continued)

OTHER PUBLICATIONS

F-Secure, "F-Secure Mobile Security for S60 Users Guide", pp. 1-34, retrieved on Aug. 10, 2011, published on Jan. 26.

(Continued)

*Primary Examiner* — Harunur Rashid
(74) *Attorney, Agent, or Firm* — Dergosits & Noah LLP

(57) ABSTRACT

The security of network connections on a computing device is protected by detecting and preventing compromise of the network connections, including man-in-the-middle (MITM) attacks. Active probing and other methods are used to detect the attacks. Responses to detection include one or more of displaying a warning to a user of the computing device, providing an option to disconnect the network connection, blocking the network connection, switching to a different network connection, applying a policy, and sending anomaly information to a security server.

40 Claims, 17 Drawing Sheets

(51) Int. Cl.
*G06F 21/56* (2013.01)
*G06F 21/57* (2013.01)
*H04L 9/32* (2006.01)

(52) U.S. Cl.
CPC ............ *H04L 9/3265* (2013.01); *H04L 43/10* (2013.01); *H04L 43/12* (2013.01); *H04L 63/1425* (2013.01); *H04L 63/0823* (2013.01); *H04L 63/0884* (2013.01); *H04L 67/42* (2013.01)

(56) References Cited

U.S. PATENT DOCUMENTS

| | | |
|---|---|---|
| 6,185,689 B1 | 2/2001 | Todd et al. |
| 6,272,353 B1 | 8/2001 | Dicker et al. |
| 6,301,668 B1 | 10/2001 | Gleichauf et al. |
| 6,453,345 B2 | 9/2002 | Trcka et al. |
| 6,696,941 B2 | 2/2004 | Baker |
| 6,892,225 B1 | 5/2005 | Tu et al. |
| 6,907,530 B2 | 6/2005 | Wang |
| 6,959,184 B1 | 10/2005 | Byers et al. |
| 7,152,244 B2 | 12/2006 | Toomey |
| 7,159,237 B2 | 1/2007 | Schneier et al. |
| 7,178,166 B1 | 2/2007 | Taylor et al. |
| 7,181,252 B2 | 2/2007 | Komsi |
| 7,236,598 B2 | 6/2007 | Sheymov et al. |
| 7,237,264 B1 | 6/2007 | Graham et al. |
| 7,304,570 B2 | 12/2007 | Thomas et al. |
| 7,346,605 B1 | 3/2008 | Hepworth et al. |
| 7,363,500 B2 | 4/2008 | Funk |
| 7,437,158 B2 | 10/2008 | Russell |
| 7,464,407 B2 | 12/2008 | Nakae et al. |
| 7,472,422 B1 | 12/2008 | Agbabian |
| 7,493,403 B2 | 2/2009 | Shull et al. |
| 7,568,220 B2 | 7/2009 | Burshan |
| 7,634,800 B2 | 12/2009 | Ide et al. |
| 7,640,585 B2 | 12/2009 | Lee et al. |
| 7,761,583 B2 | 7/2010 | Shull et al. |
| 7,783,281 B1 | 8/2010 | Cook et al. |
| 7,809,366 B2 | 10/2010 | Rao et al. |
| 7,877,784 B2 | 1/2011 | Chow et al. |
| 7,882,247 B2 | 2/2011 | Sturniolo et al. |
| 7,882,557 B2 | 2/2011 | Coskun et al. |
| 7,978,691 B1 | 7/2011 | Cole |
| 7,991,854 B2 | 8/2011 | Bahl |
| 8,001,610 B1 | 8/2011 | Chickering et al. |
| 8,087,082 B2 | 12/2011 | Bloch et al. |
| 8,095,172 B1 | 1/2012 | Cole et al. |
| 8,108,555 B2 | 1/2012 | Awadallah et al. |
| 8,112,797 B2 | 2/2012 | Coskun et al. |
| 8,121,617 B1 | 2/2012 | LaGrotta et al. |
| 8,126,456 B2 | 2/2012 | Lotter et al. |
| 8,127,350 B2 | 2/2012 | Wei et al. |
| 8,135,395 B2 | 3/2012 | Cassett et al. |
| 8,151,327 B2 | 4/2012 | Eisen |
| D659,157 S | 5/2012 | Klein et al. |
| 8,195,196 B2 | 6/2012 | Haran et al. |
| 8,200,773 B2 | 6/2012 | Bluestone et al. |
| D664,430 S | 7/2012 | Kelly et al. |
| 8,259,568 B2 | 9/2012 | Laudermilch et al. |
| 8,261,351 B1 | 9/2012 | Thornewell et al. |
| 8,266,288 B2 | 9/2012 | Banerjee et al. |
| 8,266,324 B2 | 9/2012 | Baratakke et al. |
| D671,132 S | 11/2012 | Woo |
| 8,346,860 B2 | 1/2013 | Berg et al. |
| 8,352,738 B2 | 1/2013 | Pamo et al. |
| 8,356,080 B2 | 1/2013 | Luna et al. |
| 8,364,785 B2 | 1/2013 | Plamondon |
| D677,688 S | 3/2013 | Woo |
| D680,131 S | 4/2013 | Anzures |
| 8,464,335 B1 | 6/2013 | Sinha et al. |
| 8,484,332 B2 | 7/2013 | Bush et al. |
| 8,484,460 B1 | 7/2013 | Vaughn et al. |
| 8,521,131 B1 | 8/2013 | Ramalingam et al. |
| 8,677,497 B2 | 3/2014 | Basavapatna |
| 8,869,259 B1 | 10/2014 | Udupa et al. |
| 8,869,279 B2 | 10/2014 | Shulman et al. |
| 8,949,993 B2 | 2/2015 | Basavapatna |
| 8,984,604 B2 | 3/2015 | Begley et al. |
| 8,997,231 B2 | 3/2015 | Karta et al. |
| 9,112,896 B2 | 8/2015 | Basavapatna et al. |
| 9,197,606 B2 | 11/2015 | Deschenes et al. |
| 9,288,223 B2 | 3/2016 | Sharabani et al. |
| 9,298,494 B2 | 3/2016 | Gathala et al. |
| 9,503,463 B2 | 11/2016 | Karta et al. |
| 9,602,531 B1 | 3/2017 | Wallace et al. |
| 2002/0157019 A1* | 10/2002 | Kadyk ................ H04L 63/0281 726/4 |
| 2004/0015725 A1 | 1/2004 | Boneh et al. |
| 2004/0022258 A1 | 2/2004 | Tsukada et al. |
| 2004/0120260 A1 | 6/2004 | Bernier |
| 2004/0209608 A1 | 10/2004 | Kouznetsov et al. |
| 2004/0225887 A1 | 11/2004 | O'Neil et al. |
| 2004/0259532 A1 | 12/2004 | Isomaki et al. |
| 2004/0259553 A1* | 12/2004 | Delaney ................ H04H 20/72 455/445 |
| 2005/0010821 A1 | 1/2005 | Cooper et al. |
| 2005/0074106 A1 | 4/2005 | Orlamunder et al. |
| 2005/0076246 A1 | 4/2005 | Singhal |
| 2005/0091308 A1 | 4/2005 | Bookman et al. |
| 2005/0102514 A1 | 5/2005 | Bergenwall et al. |
| 2005/0130627 A1 | 6/2005 | Calmels et al. |
| 2005/0138450 A1 | 6/2005 | Hsieh |
| 2005/0186954 A1 | 8/2005 | Kenney |
| 2005/0221800 A1 | 10/2005 | Jackson et al. |
| 2005/0240999 A1 | 10/2005 | Rubin et al. |
| 2005/0278777 A1 | 12/2005 | Loza |
| 2006/0075472 A1 | 4/2006 | Sanda et al. |
| 2006/0085357 A1 | 4/2006 | Pizarro |
| 2006/0130145 A1 | 6/2006 | Choi et al. |
| 2006/0150238 A1 | 6/2006 | D'Agostino |
| 2006/0212931 A1 | 9/2006 | Shull et al. |
| 2006/0217115 A1 | 9/2006 | Cassett et al. |
| 2006/0218636 A1 | 9/2006 | Chaum |
| 2006/0224742 A1 | 10/2006 | Shahbazi |
| 2006/0236325 A1 | 10/2006 | Rao et al. |
| 2006/0253584 A1 | 11/2006 | Dixon et al. |
| 2006/0272011 A1* | 11/2006 | Ide ........................ G06F 21/31 726/5 |
| 2006/0277408 A1 | 12/2006 | Bhat et al. |
| 2006/0294582 A1 | 12/2006 | Linsley-Hood et al. |
| 2007/0011319 A1 | 1/2007 | McClure et al. |
| 2007/0015519 A1 | 1/2007 | Casey |
| 2007/0021112 A1 | 1/2007 | Byrne et al. |
| 2007/0028095 A1 | 2/2007 | Allen et al. |
| 2007/0038677 A1 | 2/2007 | Reasor et al. |
| 2007/0089165 A1 | 4/2007 | Wei et al. |
| 2007/0090954 A1 | 4/2007 | Mahaffey |
| 2007/0154014 A1 | 7/2007 | Aissi et al. |
| 2007/0186275 A1 | 8/2007 | Shahbazi |
| 2007/0190995 A1 | 8/2007 | Wang et al. |
| 2007/0214245 A1 | 9/2007 | Hamalainen et al. |
| 2007/0214504 A1 | 9/2007 | Milani Comparetti et al. |
| 2007/0220259 A1 | 9/2007 | Pavlicic |
| 2007/0240127 A1 | 10/2007 | Rogues et al. |
| 2007/0250627 A1 | 10/2007 | May et al. |
| 2007/0293263 A1 | 12/2007 | Eslambolchi et al. |
| 2008/0046369 A1 | 2/2008 | Wood |
| 2008/0047007 A1 | 2/2008 | Satkunanathan et al. |
| 2008/0049653 A1 | 2/2008 | Demirhan et al. |
| 2008/0060062 A1 | 3/2008 | Lord |
| 2008/0070495 A1 | 3/2008 | Stricklen et al. |
| 2008/0086638 A1 | 4/2008 | Mather |
| 2008/0109871 A1 | 5/2008 | Jacobs |
| 2008/0134281 A1 | 6/2008 | Shinde et al. |
| 2008/0148381 A1 | 6/2008 | Aaron |
| 2008/0172746 A1 | 7/2008 | Lotter et al. |
| 2008/0178294 A1 | 7/2008 | Hu et al. |
| 2008/0181116 A1 | 7/2008 | Kavanaugh et al. |
| 2008/0318562 A1 | 8/2008 | Featherstone et al. |
| 2008/0244407 A1 | 10/2008 | Eklund |
| 2008/0250500 A1 | 10/2008 | Olson et al. |
| 2008/0275992 A1 | 11/2008 | Basty et al. |
| 2008/0307243 A1 | 12/2008 | Lee |

(56) References Cited

U.S. PATENT DOCUMENTS

| | | |
|---|---|---|
| 2009/0006956 A1 | 1/2009 | Bae et al. |
| 2009/0064330 A1 | 3/2009 | Shraim et al. |
| 2009/0070283 A1 | 3/2009 | Kang et al. |
| 2009/0119143 A1 | 5/2009 | Silver et al. |
| 2009/0172227 A1 | 7/2009 | Taylor et al. |
| 2009/0205016 A1 | 8/2009 | Milas |
| 2009/0210712 A1 | 8/2009 | Fort |
| 2009/0300511 A1 | 12/2009 | Behar et al. |
| 2010/0019731 A1 | 1/2010 | Connolly et al. |
| 2010/0064341 A1 | 3/2010 | Aldera |
| 2010/0097494 A1 | 4/2010 | Gum et al. |
| 2010/0100591 A1 | 4/2010 | Mahaffey et al. |
| 2010/0100939 A1 | 4/2010 | Burgess et al. |
| 2010/0100959 A1 | 4/2010 | Mahaffey |
| 2010/0100963 A1 | 4/2010 | Mahaffey et al. |
| 2010/0100964 A1 | 4/2010 | Mahaffey et al. |
| 2010/0154032 A1 | 6/2010 | Ollmann |
| 2010/0210240 A1 | 8/2010 | Mahaffey et al. |
| 2010/0240419 A1 | 9/2010 | Horino |
| 2010/0262924 A1 | 10/2010 | Kalu |
| 2010/0275127 A1 | 10/2010 | Morita et al. |
| 2010/0306432 A1 | 12/2010 | Juarez et al. |
| 2011/0047033 A1 | 2/2011 | Mahaffey et al. |
| 2011/0047594 A1 | 2/2011 | Mahaffey et al. |
| 2011/0047597 A1 | 2/2011 | Mahaffey et al. |
| 2011/0047620 A1 | 2/2011 | Mahaffey et al. |
| 2011/0072262 A1 | 3/2011 | Amir et al. |
| 2011/0107414 A1 | 5/2011 | Diab et al. |
| 2011/0119765 A1 | 5/2011 | Hering et al. |
| 2011/0145920 A1 | 6/2011 | Mahaffey et al. |
| 2011/0171923 A1 | 7/2011 | Daly et al. |
| 2011/0173698 A1 | 7/2011 | Polyakov et al. |
| 2011/0225492 A1 | 9/2011 | Boettcher et al. |
| 2011/0225505 A1 | 9/2011 | Uchida et al. |
| 2011/0235624 A1 | 9/2011 | Scott et al. |
| 2011/0241872 A1 | 10/2011 | Mahaffey |
| 2011/0289423 A1 | 11/2011 | Kim et al. |
| 2011/0296510 A1 | 12/2011 | Hatlelid et al. |
| 2012/0042382 A1 | 3/2012 | Mahaffey |
| 2012/0060222 A1 | 3/2012 | Mahaffey et al. |
| 2012/0072569 A1 | 3/2012 | Xu |
| 2012/0084836 A1 | 4/2012 | Mahaffey et al. |
| 2012/0084864 A1 | 4/2012 | Mahaffey et al. |
| 2012/0096555 A1 | 4/2012 | Mahaffey |
| 2012/0110174 A1 | 5/2012 | Wooten et al. |
| 2012/0124239 A1 | 5/2012 | Shribman et al. |
| 2012/0159607 A1 | 6/2012 | Wei et al. |
| 2012/0173680 A1 | 7/2012 | Coskun et al. |
| 2012/0179801 A1 | 7/2012 | Luna et al. |
| 2012/0179814 A1 | 7/2012 | Swildens et al. |
| 2012/0185780 A1 | 7/2012 | Ma |
| 2012/0188064 A1 | 7/2012 | Mahaffey et al. |
| 2012/0196571 A1 | 8/2012 | Grkov et al. |
| 2012/0233674 A1 | 9/2012 | Gladstone et al. |
| 2012/0233695 A1 | 9/2012 | Mahaffey et al. |
| 2012/0240183 A1 | 9/2012 | Sinha |
| 2012/0250658 A1 | 10/2012 | Eisl et al. |
| 2012/0254285 A1 | 10/2012 | Tiger et al. |
| 2012/0259954 A1 | 10/2012 | McCarthy et al. |
| 2012/0303735 A1 | 11/2012 | Raciborski et al. |
| 2012/0311659 A1 | 12/2012 | Narain et al. |
| 2012/0317233 A1 | 12/2012 | Redpath |
| 2012/0324076 A1 | 12/2012 | Zerr et al. |
| 2012/0324094 A1 | 12/2012 | Wyatt et al. |
| 2012/0324568 A1 | 12/2012 | Wyatt et al. |
| 2013/0019311 A1 | 1/2013 | Swildens et al. |
| 2013/0023209 A1 | 1/2013 | Fisher et al. |
| 2013/0041974 A1 | 2/2013 | Luna et al. |
| 2013/0055163 A1 | 2/2013 | Matas |
| 2013/0061038 A1 | 3/2013 | Pao et al. |
| 2013/0086682 A1 | 4/2013 | Mahaffey et al. |
| 2013/0097710 A1 | 4/2013 | Basavapatna et al. |
| 2013/0155879 A1 | 6/2013 | He et al. |
| 2013/0294602 A1 | 11/2013 | Huxham et al. |
| 2014/0331275 A1 | 11/2014 | Singh |
| 2014/0351573 A1* | 11/2014 | Martini ............... H04L 63/0428 713/153 |
| 2014/0359777 A1 | 12/2014 | Lam et al. |
| 2015/0188932 A1 | 7/2015 | King et al. |
| 2015/0195252 A1 | 7/2015 | Walter et al. |
| 2016/0099963 A1 | 4/2016 | Mahaffey et al. |
| 2016/0112450 A1 | 4/2016 | Basavapatna et al. |
| 2016/0218881 A1 | 7/2016 | Adams |

FOREIGN PATENT DOCUMENTS

| | | |
|---|---|---|
| WO | 2010048218 | 4/2010 |
| WO | 2010048220 | 4/2010 |
| WO | 2012027588 | 1/2012 |
| WO | 2016162687 A1 | 10/2016 |

OTHER PUBLICATIONS

Kaspersky "Kaspersky Mobile Security", available at http://usa.kaspersky.com/products-services/home-computer-security, published on Jan. 1, 2007, retrieved on Oct. 21, 2008.

"Kaspersky Mobile Security", Kaspersky Lab 2008, available at http://www.kaspersky.com/kaspersky_mobile_security, retrieved on Sep. 11, 2008, published on Jun. 22, 2010, 2 Pages.

TippingPoint "TippingPoint Security Management System (SMS)", available at http://www.tippingpoint.com/products_sms.html, retrieved on Oct. 21, 2008, published on Mar. 31, 2005, 2 pages.

Summerson, Cameron "5 Android Antivirus Apps Compared, Find Out Which Ones Are Worth Having!," Android Headlines, available at http://androidheadlines.com/2011/03/5-android-antivirus-apps-comapred-find-out-which-ones-are-worth-having.html, retrieved on Mar. 30, 2012, published on Mar. 8, 2011, 9 pages.

"Get the Physical Location of Wireless Router From its MAC Address (BSSID)," Coderrr, available at http://coderrr.wordpress.com/2008/09/10/get-the-physical-location-of-wireless-router-from-its-mac-address-bssid/, retrieved on Mar. 30, 2012, published on Sep. 12, 2008, 13 pages.

Diligenti, M., et al. Focused Crawling Using Context Graphs:, Proceedings of the 26th VLDB Conference, Cairo, Egypt, pp. 1-8, available at www.vldb.org/conf/2000/P257.pdf, retrieved on Oct. 21, 2008, published on Sep. 10, 2000.

Grafio "Stay Secure", available at http://widgets.opera.com/widget/4405/, retrieved Oct. 21, 2008, published on Sep. 29, 2008.

Dormann et al. "Securing Your Web Browser", Software Engineering Institute, Carnegie Mellon. Web page downloaded Nov. 4, 2013 from http://www.cert.org/tech_tips/securing_browser/, pp. 1-17.

HTTP Strict Transport Security (HSTS), IETF RFC 6797, web page downloaded from https://tools.ietf.org/html/rfc6797,May 5, 2017, 47 pages.

Unicode Technical Report #39 Unicode Security Mechanisms, web page downloaded May 5, 2017 from https://unicode.org/reports/tr39/, 27 pages.

"I'm Aza Raskin@aza. I make shiny things. I simiplify.", "Vote! How to Detect the Social Sites Your Visitors Use", web page downloaded Nov. 4, 2013 from http://www.ararask.in/blog/post/socialhistory/is, pp. 1-83.

David M. Nicol, Model-Based Evaluation: From Dependability to Security, 2006, IEEE, pp. 1-17.

Notification of Transmittal of the International Search Report and the Written Opinion of the International Searching Authority for PCT/US17/35016, dated Sep. 22, 2017, 12 pages.

PCT International Preliminary Report on Patentability for PCT/US2011/049182; dated Mar. 7, 2013; pp. 1-9.

Non-Final Office Action dated Dec. 26, 2012 for U.S. Appl. No. 13/160,382, filed Jun. 14, 2011; pp. 1-21.

Sprite Mobile, Sprite Backup, Internet Archive, Way Back Machine, available at http://web.archive.org/web/20080903231803/http://www.spritesoftware.com/?page_id=280, 4 pages, Retrieved Jan. 16, 2013.

Sprint Nextel, Mobile Locator, Internet Archive, Way Back Machine, available at http://web.archive.org/web/20080901070835/http://www.nextel.com/en/solutions/gps/mobile_locator_shtml, 2 pages, Retrieved Jan. 16, 2013.

(56) References Cited

OTHER PUBLICATIONS

K. Benton, Joyeon Jo, Yoohwan Kim. Signature Check: A Protocol to Detect Man-In-The-Middle Attack in SSL. ACM CSIIRW '11 Oct. 12-14, 2011, 4 pages.

E. Kirda, C. Kruegel. Protecting Users Against Phishing Attacks with AntiPhish. COMPSAC 2005, pp. 1-8.

Preventing attacks on a user's history through CSS: visited selectors, "How CSS can be used to query a user's browser history", L. David Baron, Mozilla Corporation, Internet Archive, Way Back Machine, available at https://web.archive.org/web/201311011024118/http://dbaron.org/mozilla/visited-privacy, Retrieved Oct. 16, 2017, 3 pages.

Software Engineering Institute, Carnegie Mellon; "Securing Your Web Browser", Dormann et al., Internet Archive, Way Back Machine, available at https://web.archive.org/web/20131015224907/http://www.cert.org/tech_tips/securing_browsed, Retrieved Oct. 16, 2017, 15 pages.

Content Security Policy 1.0, "W3C Candidate Recommendation Nov. 15, 2012", Internet Archive, Way Back Machine, available at https://web.archive.org/web/20131102204842/http://www.w3org/TR/CSP/, Retrieved Oct. 16, 2017, 10 pages.

Notification Concerning Transmittal of International Preliminary Report on Patentability for PCT/US1017/035016, dated Dec. 13, 2018, 9 pages.

\* cited by examiner

FIG. 12

FIG. 13

METHODS AND SYSTEMS FOR DETECTING AND PREVENTING NETWORK CONNECTION COMPROMISE

CROSS-REFERENCE TO RELATED CASES

The present application claims priority to U.S. Provisional Patent Application 62/343,748, entitled "METHODS AND SYSTEMS FOR DETECTING AND PREVENTING NETWORK CONNECTION COMPROMISE," filed on May 31, 2016.

TECHNICAL FIELD

The present invention relates to the field of information technology, including, more particularly, to methods and systems for detecting and preventing compromise of computing device network connections, including man-in-the-middle attacks.

BACKGROUND

Computing devices connect to a variety of networks, are turned on most of the time, and automatically roam between various wireless networks and cell towers without user notification or interaction. This presents the potential opportunity for data to leak from these devices if the network connection from the device is compromised and encryption is not properly implemented. As more data goes mobile, attackers are finding more sophisticated ways to get access to it. Data in transit is increasingly becoming an enterprise risk, as employees tend to be careless about connecting to public Wi-Fi or installing proxies that can decrypt data. According to a recent report, 48% of organizations don't know if their mobile devices have connected to a malicious Wi-Fi, while 24% have confirmed such an exposure. Encrypted traffic mitigates many of the threats associated with connecting to the internet through untrusted access points or proxies, but does not solve all problems. This is in part because users are being trained to install configuration profiles (on iOS, for example) with root Certificate Authorities (CAs) as part of the connection process. For example, New York City is actually requiring users to do this for their new free Wi-Fi program "LinkNYC." The most common scenario described by the media is that of an attacker sitting in the same coffee shop as you, capturing or modifying your data as it is sent out over the free Wi-Fi. These methods can allow an attacker to view encrypted enterprise data, such as corporate login credentials. As attacks on the network increase in sophistication and prevalence, organizations need to have visibility and protection into this emerging risk.

It would be desirable to be able to ensure that a computing device is configured according to a policy that prevents or reduces the threat of a Man in The Middle (MITM) attack. There is a need to be able to detect the possibility or actuality of a MITM attacker, and to respond with warnings to a computing device or user or enterprise console or administrator, or to block insecure communications. There is a need to prevent SSL downgrade attacks. There is a need to protect applications that do not properly validate certificates. There is a need to report instances of attempted MITM attacks to an enterprise console or security data store. There is a need to have policies that can protect applications that improperly validate certificates or certificate chains or related information; or policies to disallow the usage of inappropriate certificates or configuration profiles in a computing device's trusted certificate store for particular applications or destination hosts or services (DESTHOSTs). There is a need to prevent MITM attacks.

Threat Profiles

Active network man-in-the-middle attacks can take any of several forms. The following presents a summary of the problem space of threat profiles related to MITM attacks.

Hostile Network: an attacker sets up a hostile Access Point that mimics a network a user reasonably trusts, either through previous association, or common known usage. When a computing device attaches to the network, the AP has in-line agency to intercept and modify traffic at will.

ARP Man-in-the-middle: an attacker uses gratuitous Address Resolution Protocol (ARP) to advertise its own hardware address in place of a gateway, proxy, or host on the victim's connection path.

SSLBump: an attacker subverts Dynamic Host Configuration Protocol (DHCP), or uses a malicious application, configuration profile, or other attack vector to introduce a proxy under attacker control into the configuration of the victim's network stack.

SSLStrip: an attacker subverts un-encrypted connections made by the victim, rewriting URLs in plain text documents that would normally be specified as HTTPS (Hyper Text Transfer Protocol Secure) to use plaintext HTTP (Hyper Text Transfer Protocol).

Host Certificate Hijacking: an attacker introduces a malicious certificate under attacker control into the trusted certificate store of the victim device, allowing the attacker to masquerade as one or more hosts that the victim intends to communicate with securely. An enterprise uses essentially the same technique to perform what is called "SSL intercept" or "SSL Interception," for the purpose of providing Data Loss Prevention (DLP) or other services. SSL intercept is a process to decipher and inspect the content of data being transmitted via Secure Sockets Layer (SSL) or Transport Layer Security (TLS), and is possible because certificates can be created that are associated with a particular hostname, or common name, in SSL nomenclature. In Host Certificate Hijacking there is a certificate that is provisioned into the trusted certificate store of a device used by an employee of the enterprise. The malicious certificate in this instance chains up to the enterprise's certificate that is stored in the trusted certificate store of a device used by an employee of the enterprise.

TLS Protocol Downgrade: an attacker manipulates the negotiated connection to downgrade the protocol or negotiated cipher suites, and lower the security guarantees of the connection.

TLS Exploit: an attacker exploits a vulnerable client or server TLS implementation to compromise the security of the transport (e.g. heartbleed vulnerability in TLS).

BRIEF SUMMARY

The security of network connections on a computing device is protected by detecting and preventing the compromise of the network connections, including man-in-the-middle attacks. Active probing and other methods are used to detect the attacks. Responses to detection include one or more of displaying a warning to a user of the computing device, providing an option to disconnect the network connection, blocking the network connection, switching to a different network connection, applying a policy, and sending anomaly information to a security server.

Other objects, features, and advantages of the embodiments will become apparent upon consideration of the following detailed description and the accompanying drawings, in which like reference designations represent like features throughout the figures.

BRIEF DESCRIPTION OF THE DRAWINGS

The embodiments are illustrated by way of example and not limitation in the figures of the accompanying drawings, in which like references indicate similar elements, and in which:

FIG. 12 illustrates an administrator display showing the details of a high risk application threat in the category of a Man-in-the-Middle Attack, according to an embodiment.

FIG. 13 illustrates an administrator display showing the details of a Man-in-the-Middle Attack, according to an embodiment.

DETAILED DESCRIPTION

1. Architecture

Figure 1:
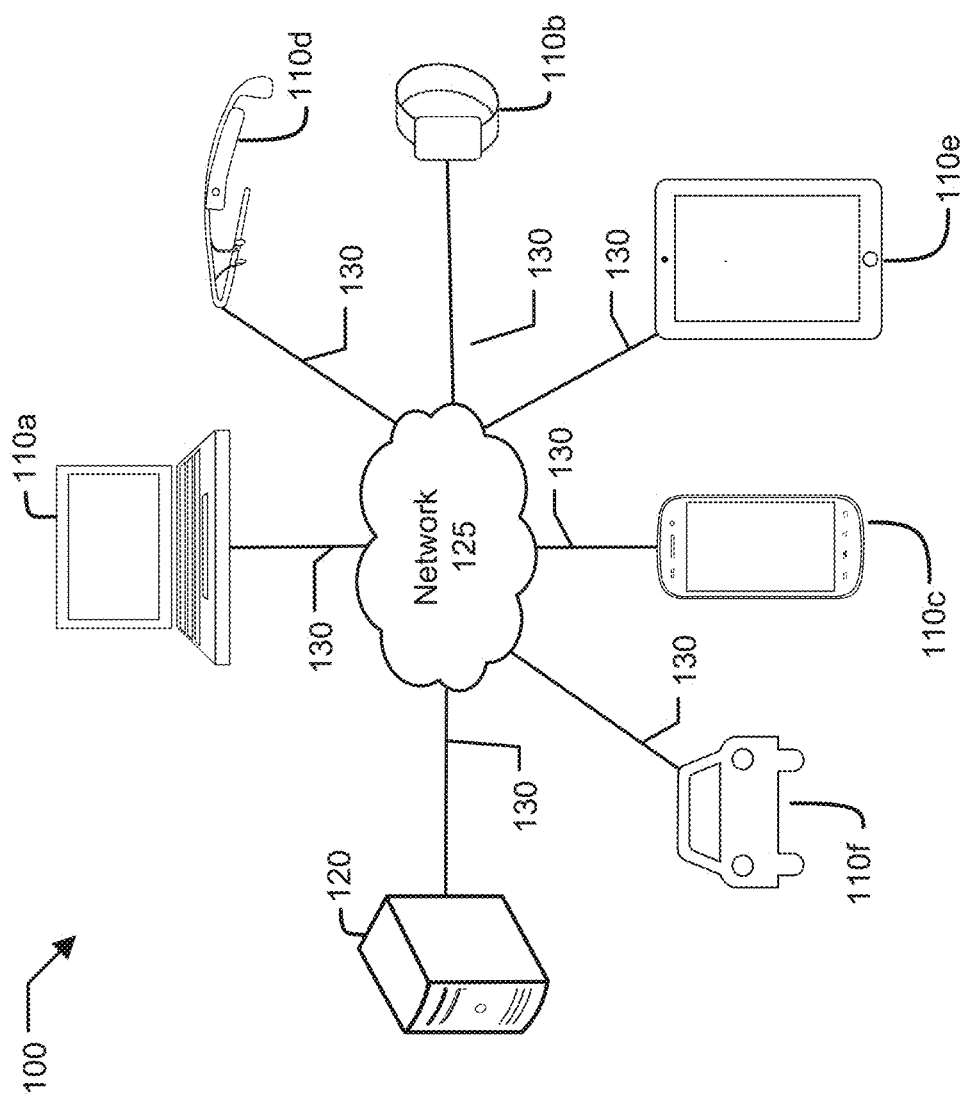
FIG. 1 is an exemplary block diagram depicting an embodiment of the disclosure.

FIG. 1 is a simplified block diagram of a distributed computer network 100 incorporating an embodiment of the subject matter. Computer network 100 includes a number of computing devices 110a-110f, and one or more server systems 120 coupled to a communication network 125 via a plurality of communication links 130. Communication network 125 provides a mechanism for allowing the various components of distributed network 100 to communicate and exchange information with each other.

Communication network 125 itself is comprised of one or more interconnected computer systems and communication links. Communication links 130 may include hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, UDP, HTTP protocols, wireless application protocol (WAP), BLUETOOTH, Zigbee, 802.11, 802.15, 6LoWPAN, LiFi, Google Weave, NFC, GSM, CDMA, other cellular data communication protocols, wireless telephony protocols, Internet telephony, IP telephony, digital voice, voice over broadband (VoBB), broadband telephony, Voice over IP (VoIP), vendor-specific protocols, customized protocols, and others. While in one embodiment, communication network 125 is the Internet, in other embodiments, communication network 125 may be any suitable communication network including a local area network (LAN), a wide area network (WAN), a wireless network, a cellular network, a personal area network, an intranet, a private network, a near field communications (NFC) network, a public network, a switched network, a peer-to-peer network, and combinations of these, and the like.

In an embodiment, the server 120 is not located near a user of a computing device, and is communicated with over a network. In a different embodiment, the server 120 is a device that a user can carry upon his person, or can keep nearby. In an embodiment, the server 120 has a large battery to power long distance communications networks such as a cell network or Wi-Fi. The server 120 communicates with the other components of the personal mobile device system via wired links or via low powered short range wireless communications such as BLUETOOTH. In an embodiment, one of the other components of the personal mobile device system plays the role of the server, e.g., the watch 110b, the head mounted device or glasses or virtual reality or augmented reality device 110d, the phone or mobile communications device 110c, the tablet 110e, the PC 110a, and/or the vehicle (e.g., an automobile, or other manned or unmanned or autonomous vehicle for land or aerial or aquatic operation) 110f. Other types of computing devices 110 include other wearable devices, devices incorporated into clothing, implantable or implanted devices, ingestible devices, or 'things' in the internet of things, which may be sensors or actuators or mobile or sessile devices, or hubs or servers controlling such 'things' or facilitating their communications.

Distributed computer network 100 in FIG. 1 is merely illustrative of an embodiment incorporating the embodiments and does not limit the scope of the invention as recited in the claims. One of ordinary skill in the art would recognize other variations, modifications, and alternatives. For example, more than one server system 120 may be connected to communication network 125. As another example, a number of computing devices 110a-110f may be coupled to communication network 125 via an access provider (not shown) or via some other server system.

Computing devices 110a-110f typically request information from a server system that provides the information. Server systems by definition typically have more computing and storage capacity than these computing devices, which are often such things as portable devices, mobile communications devices, or other computing devices that play the role of a client in a client-server operation. However, a particular computing device may act as both a client and a server depending on whether the computing device is requesting or providing information. Aspects of the embodiments may be embodied using a client-server environment or a cloud-cloud computing environment.

Server 120 is responsible for receiving information requests from computing devices 110a-110f, for performing processing required to satisfy the requests, and for forwarding the results corresponding to the requests back to the requesting computing device. The processing required to satisfy the request may be performed by server system 120 or may alternatively be delegated to other servers connected to communication network 125 or to other communications networks. A server 120 may be located near the computing devices 110 or may be remote from the computing devices 110. A server 120 may be a hub controlling a local enclave of things in an internet of things scenario.

Computing devices 110a-110f enable users to access and query information or applications stored by server system 120. Some example computing devices include portable electronic devices (e.g., mobile communications devices) such as the Apple iPhone®, the Apple iPad®, the Palm Pre™, or any computing device running the Apple iOS™, Android™ OS, Google Chrome OS, Symbian OS®, Windows 10, Windows Mobile® OS, Palm OS® or Palm Web OS™, or any of various operating systems used for Internet of Things (IoT) devices or automotive or other vehicles or Real Time Operating Systems (RTOS), such as the RIOT OS, Windows 10 for IoT, WindRiver VxWorks, Google Brillo, ARM Mbed OS, Embedded Apple iOS and OS X, the Nucleus RTOS, Green Hills Integrity, or Contiki, or any of various Programmable Logic Controller (PLC) or Programmable Automation Controller (PAC) operating systems such as Microware OS-9, VxWorks, QNX Neutrino, FreeRTOS, Micrium μC/OS-II, Micrium μC/OS-III, Windows CE, TI-RTOS, RTEMS. Other operating systems may be used. In a specific embodiment, a "web browser" application executing on a computing device enables users to select, access, retrieve, or query information and/or applications stored by server system 120. Examples of web browsers include the Android browser provided by Google, the Safari® browser provided by Apple, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the device, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various acts and operations described hereinafter may also be implemented in hardware.

Figure 2:
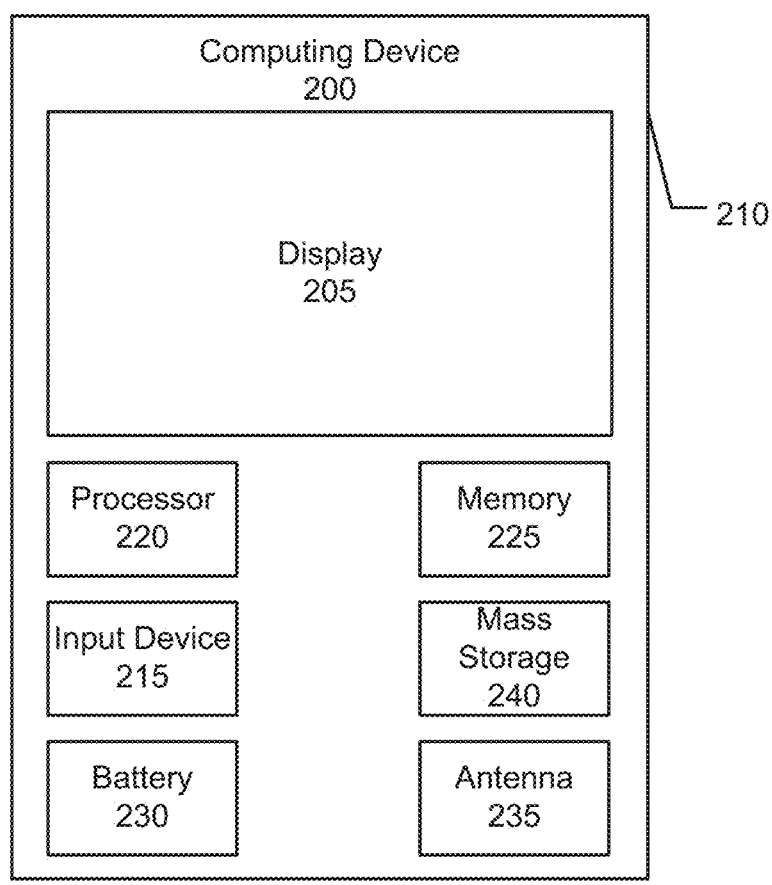
FIG. 2 is an exemplary block diagram depicting a computing device.

FIG. 2 shows an exemplary computing device 200 of an embodiment. Computing device 200 may be any of the computing devices 110 from FIG. 1. Computing device 200 may include a display, screen, or monitor 205, housing 210, and input device 215. Housing 210 houses familiar computer components, some of which are not shown, such as a processor 220, memory 225, battery 230, speaker, transceiver, antenna 235, microphone, ports, jacks, connectors, camera, input/output (I/O) controller, display adapter, network interface, mass storage devices 240, various sensors, and the like.

Input device 215 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, or combinations of these.

Mass storage devices 240 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, SD cards, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

Embodiments may also be used with computer systems having different configurations, e.g., with additional or fewer subsystems. For example, a computer system could include more than one processor (i.e., a multiprocessor system, which may permit parallel processing of information) or a system may include a cache memory. The computer system shown in FIG. 2 is but an example of a computer system suitable for use with the embodiments. Other configurations of subsystems suitable for use with the embodiments will be readily apparent to one of ordinary skill in the art. For example, in a specific implementation, the computing device is a mobile communications device such as a smartphone or tablet computer. Some specific examples of smartphones include the Droid Incredible and Google Nexus One, provided by HTC Corporation, the iPhone or iPad, both provided by Apple, and many others. The computing device may be a laptop or a netbook. In another specific implementation, the computing device is a non-portable computing device such as a desktop computer or workstation.

A computer-implemented or computer-executable version of the program instructions useful to practice the embodiments may be embodied using, stored on, or associated with computer-readable medium. A computer-readable medium may include any medium that participates in providing instructions to one or more processors for execution, such as memory 225 or mass storage 240. Such a medium may take many forms including, but not limited to, nonvolatile, volatile, transmission, non-printed, and printed media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software useful to practice the embodiments may be stored or reside in RAM or cache memory, or on mass storage device 240. The source code of this software may also be stored or reside on mass storage device 240 (e.g., flash drive, hard disk, magnetic disk, tape, or CD-ROM). As a further example, code useful for practicing the embodiments may be transmitted via wires, radio waves, or through a network such as the Internet. In another specific embodiment, a computer program product including a variety of software program code to implement features of the embodiment is provided.

Computer software products may be written in any of various suitable programming languages, such as C, C++, C#, Pascal, Fortran, Perl, Matlab (from MathWorks, www.mathworks.com), SAS, SPSS, JavaScript, CoffeeScript, Objective-C, Objective-J, Ruby, Python, Erlang, Lisp, Scala, Clojure, and Java. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be the Android operating system, iPhone OS (i.e., iOS), Symbian, BlackBerry OS, Palm web OS, Bada, MeeGo, Maemo, Limo, or Brew OS. Other examples of operating systems include one of the Microsoft Windows family of operating systems (e.g., Windows 95, 98, Me, Windows NT, Windows 2000, Windows XP, Windows XP x64 Edition, Windows Vista, Windows 10 or other Windows versions, Windows CE, Windows Mobile, Windows Phone, Windows 10 Mobile), Linux, HP-UX, UNIX, Sun OS, Solaris, Mac OS X, Alpha OS, AIX, IRIX32, or IRIX64, or any of various operating systems used for Internet of Things (IoT) devices or automotive or other vehicles or Real Time Operating Systems (RTOS), such as the RIOT OS, Windows 10 for IoT, WindRiver VxWorks, Google Brillo, ARM Mbed OS, Embedded Apple iOS and OS X, the Nucleus RTOS, Green Hills Integrity, or Contiki, or any of various Programmable Logic Controller (PLC) or Programmable Automation Controller (PAC) operating systems such as Microware OS-9, VxWorks, QNX Neutrino, FreeRTOS, Micrium μC/OS-II, Micrium μC/OS-III, Windows CE, TI-RTOS, RTEMS. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system useful in practicing the embodiments using a wireless network employing a protocol such as Wi-Fi (IEEE standards 802.11, 802.11a, 802.11b, 802.11e, 802.11g, 802.11i, and 802.11n, just to name a few examples), or other protocols, such as BLUETOOTH or NFC or 802.15 or cellular, or communication protocols may include TCP/IP, UDP, HTTP protocols, wireless application protocol (WAP), BLUETOOTH, Zigbee, 802.11, 802.15, 6LoWPAN, LiFi, Google Weave, NFC, GSM, CDMA, other cellular data communication protocols, wireless telephony protocols or the like. For example, signals from a computer may be transferred, at least in part, wirelessly to components or other computers.

Figure 3:
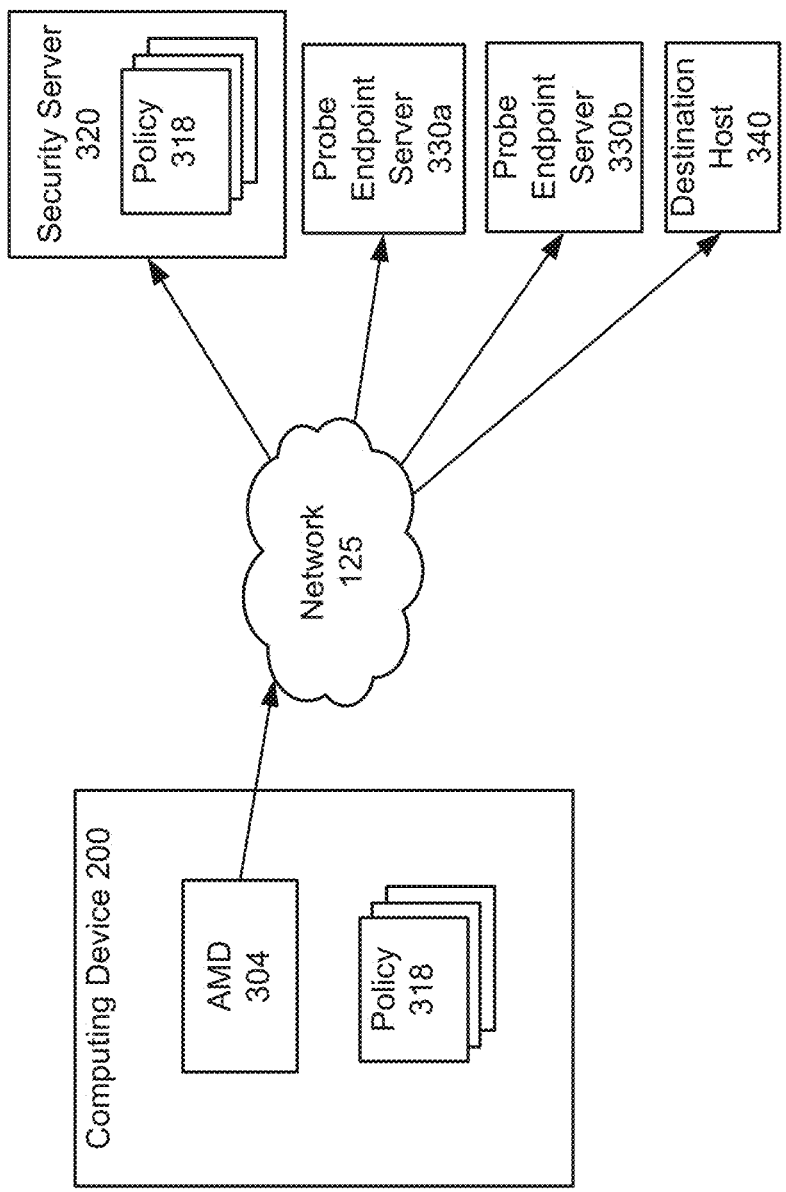
FIG. 3 shows an exemplary block diagram of an embodiment of a system for detecting and preventing network connection compromise.

FIG. 3 shows an exemplary block diagram of an embodiment of a system for detecting and preventing network connection compromise. Computing device 200 contains an Active MITM Detection component (AMD 304), which may be a stand-alone application, or may be a component of another application, such as a security application or banking application, or may be a component of the operating system, or may be a component of software running on a baseband processor of a computing device, or may involve multiple components distributed in a combination of the above locations. AMD 304 needs to be somewhere in the network flow between the originating device or the originating application program and the possible location of a man in the middle. AMD 304 may even be located on security server 320 in a configuration in which AMD 304 is making a connection back through the computing device 200 and thence onwards to any of probe endpoint servers 330*a*-330*b* or a destination host 340. In such a configuration, AMD 304 on the server 320 may make a connection (a normal network connection, or an encrypted network connection, or a network connection using a different physical network such as the cellular network (as opposed to a Wi-Fi network)) from the server 320 to the computing device 200, and from the computing device to the probe endpoint server 330*a*-330*b* or the destination host 340 via the network being tested or examined. Thus, in such configurations AMD 304 on server 320 communicates with an effective forwarding agent on the computing device 200, which in turn communicates with probe endpoint server 330*a*-330*b* or the destination host 340.

AMD 304 may perform a variety of methods to detect whether there is a MITM on a network connection. AMD 304 may operate using a policy 318 (or various policies 318) that govern how AMD 304 performs its detection methods, and how AMD 304 reports information to a security server 320, and how AMD 304 takes actions upon detecting that there is a MITM on a network connection, actions such as alerting a user of computing device 200, sending information to security server 320, blocking connections to a network 125, or other actions.

Policies 318 may reside on computing device 200. Policies 318 may be stored on security server 320. Policies 318 on computing device 200 may be periodically updated from policies 318 on security server 320, or may be pulled on demand from security server 320, or may be pushed from security server 320 to computing device 200. An administrator can specify policy regarding the detection of and response to security events. Security events can include the detection of MITM attacks or other risky or suspicious situations. Security events can be detected on a device, or can be detected by a component in network infrastructure, or at a server based on information received regarding events on a device or detected by a component in network infrastructure. An administrator console can display such policies, support their creation or modification, and can display the occurrence of security events, and the results of any responses to security events, including actions taken automatically as a result of policies or as a result of decisions by a user of a device. Security events, device security state, and other related information can be sent from a device to a security server 320, to a administrator console, or to other servers related to security infrastructure, such as a STEM (Security Information and Event Management) server, or an IDP (Identity Provider or Identity Assertion Provider, such as Active Directory, a SSO (Single Sign On) provider, or a MDM (Mobile Device Management) server or MAM (Mobile Application Management) server or EMM (Enterprise Mobility Management) server, or to a database or log accessible by any of the aforementioned servers. An Administrator is role that can be performed by a person working on behalf of an organization or enterprise, or by a person for a collection of enterprises or organizations, or by a person administering a set of devices, e.g., devices used by that person, or by that person's family or social group, etc.

AMD 304 may monitor when computing device 200 makes a network connection to a network 125. AMD 304 may perform certain methods to detect a MITM on the network connection, according to policies 318. Some of the methods involve AMD 304 communicating with probe endpoint servers 330a, 330b. A probe endpoint server 330a-330b, also called a reference server, is a server to which AMD 304 sends a request and from which AMD 304 receives a response. AMD 304 has expected results for a response from a probe endpoint server 330a or probe endpoint server 330b. AMD 304 compares part or all of a response result or information algorithmically derived from a response from a probe endpoint server to the expected results. If the comparison is satisfactory, AMD 304 determines that there is no MITM affecting this particular request and response for the probe endpoint server. If the comparison is not satisfactory, AMD 304 determines that there is some agent, a MITM, that has altered the response from the probe endpoint server to be different from the response result expected. A probe endpoint server may be the same as or different from another server; there may be multiple probe endpoint servers in a system. In an embodiment, AMD 304 counts the number of HTTPS href links embedded in the document received as a response to its probe, and compares that count to an expected count. If the count is the same, then the response result is considered to be the expected response result. In an embodiment, AMD 304 compares a part or all of a response result to an expected result. If the comparison is equal, then the response result is considered to be the expected response result. In an embodiment, AMD 304 compares a hash, for example, a SHA256 hash value, of the received response result to an expected hash value. If the comparison is equal, then the response result is considered to be the expected response result.

In an embodiment, an ordinary host server on the internet, a destination host 340, performs the role of a probe endpoint server. AMD 304 has the expected results of response by destination host 340 to a specific request sent by AMD 304 to destination host 340. The expected results are based on a recorded history of past connections to destination host 340, or are supplied by security server 320 to AMD 304. Security server 320 has the expected results of a response by having received a history of past connection responses to destination host 340 from another computing device, or by having performed a request to destination host 340 itself previously or in response to a query from AMD 304 and recording the results.

Figure 4:
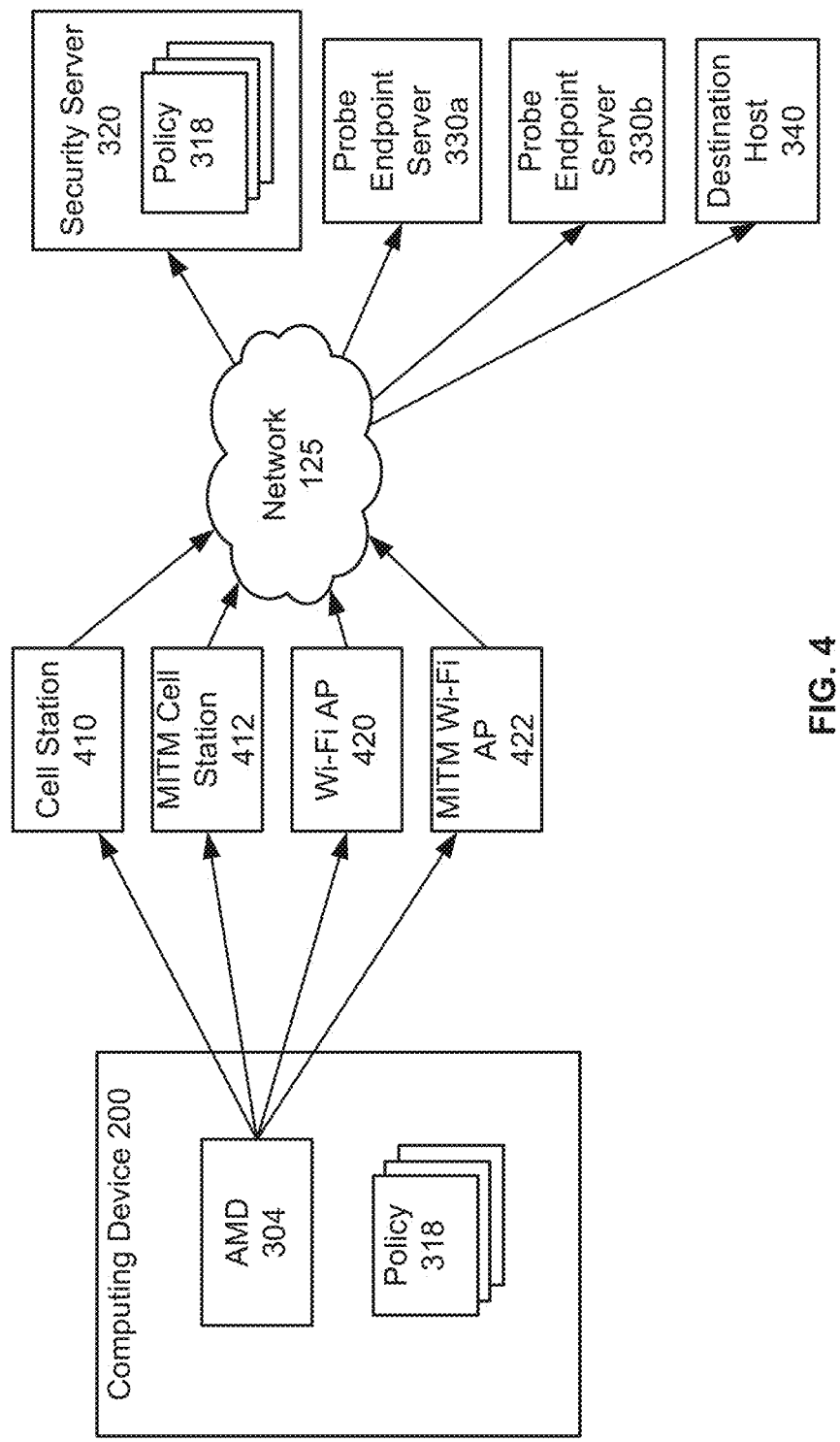
FIG. 4 shows a more detailed block diagram of an embodiment of a system for detecting and preventing network connection compromise, showing first hop network points of cell stations and Wi-Fi Access Points (APs).

FIG. 4 shows a more detailed block diagram of an embodiment of a system for detecting and preventing network connection compromise, showing first hop network points of cell stations and Wi-Fi Access Points (APs). A MITM may reside anywhere on a network path between computing device 200 and a network destination to which a communication is sent.

It is often the case that a MITM resides at the first hop, and pretends to be a provider of network services to computing device 200. For example, computing device 200 may make a network connection using cellular protocols to a cell station 410, also known as a cell base station, a cell tower, or a small cell, such as a picocell or a femtocell. A MITM may impersonate a cell station as in MITM cell station 412. To computing device 200 the MITM cell station 412 appears to be a legitimate cell station, and computing device 200 makes a network connection to MITM cell station 412 to provide network services for computing device 200. Computing device 200 may make a network connection using Wi-Fi protocols to a Wi-Fi Access Point (Wi-Fi AP 420). A MITM may impersonate a legitimate Wi-Fi AP or pretend to be another Wi-Fi AP providing network services. To computing device 200 the MITM Wi-Fi AP 422 appears to be a legitimate Wi-Fi AP, and computing device 200 makes a network connection to MITM Wi-Fi AP 422 to provide network services for computing device 200. Other protocols, such as BLUETOOTH or NFC or 802.15 or cellular or other protocols may also have a MITM impersonating a legitimate provider of networking services. A MITM may reside elsewhere in the network path, and the methods described herein apply as well to detecting a MITM that resides elsewhere in the network path than at the first hop.

2. Detection of MITM

A. Active MITM Detection on Connection

In an embodiment, active probing and device configuration analysis are employed by AMD 304 to determine whether several of the aforementioned attacks may be in-play against computing device 200. The fundamental approach is to establish active network connections to known internet hosts with expected configuration properties. By analyzing whether established connections meet expected parameters, the system can determine whether connections are being tampered with in transit.

i. Network Connection States

In an embodiment of Active MITM Detection on Connection, devices may be connected to multiple networks at any given point in time. Particularly, a typical computing device, such as a mobile communications device, may be connected to a carrier network as well as a Wi-Fi network or a Bluetooth network or other network simultaneously. Any individual network interface in computing device 200 may be considered to be in one of several relevant states:

TABLE 1

| State | Description |
| --- | --- |
| DISCONNECTED | The connection is inactive, unavailable, non-functional, and irrelevant. |
| CAPTIVE_PROBE | A network change has been detected by AMD 304; on a successful retrieval from a probe endpoint server the state will transition to ACTIVE; on an unsuccessful |

TABLE 1-continued

| State | Description |
|---|---|
| | retrieval from a probe endpoint server the state will transition to AWAITING_AUTHENTICATION. |
| AWAITING_AUTHENTICATION | The interface is active, however it is awaiting authentication via a Captive Portal, 802.1x or other means. |
| ACTIVE | The interface is active, and user applications can make full use of it. |

The state of the connection is important in order to correctly identify so-called Captive Portals that create conditions that generate false positive detections of TLS MITM. A Captive Portal is a provider of networking services, often a Wi-Fi Access Point, that provides only limited networking services until an authentication process takes place and allows wider or unrestricted network access. Wi-Fi APs at hotels or coffee shops or airports are common examples of Captive Portals. Networking requests prior to authentication are blocked or redirected by the Captive Portal to a web "landing page" that permits a user of a device to perform an authentication process. Networks that perform authentication via Captive Portals generally attempt to transparently redirect any HTTP connections to the portal in order to prompt the user to login. Some portals also attempt to redirect HTTPS connections, presenting a self-signed or host-mismatched certificate to the client in an ill-advised attempt to redirect the client.

Flagging anomalies in connections that are in the AWAITING_AUTHENTICATION state would constitute a false positive. It is, therefore, desirable to have a heuristic for identifying Captive Portal authentication, and for suppressing false positive detections under those conditions.

ii. Identifying Network Changes

In an embodiment of Active MITM Detection on Connection, a network change or transition is an event that changes the state of network connections on computing device 200, or that changes a property of a network connection, such as a change in a configured DNS server, a change in an IP address, a change in proxy specification, or other properties. For example, if computing device 200 does not have any current active network connections, and comes into range of a cell station, a network connection is established between computing device 200 and the cell station: this is a network change event.

On the iOS operating system, the "com.apple.system.config.network_change" network event may be monitored via CFNotificationCenterAddObserver on the Darwin Notification Center. This is an example of the operating system making network connection state information available direction via an API.

On the Android operating system, network transitions may be identified using the ConnectivityManager system service to receive broadcasts or callbacks on a network change. Specifically, network changes or transitions may be identified by registering for callbacks with ConnectivityManager and, via system broadcasts, combined with querying ConnectivityManager APIs.

On the Windows operating system, the INetworkListManager interface may be used to determine the properties of a network connection. A network state change background trigger, e.g., "NetworkStateChange," may monitor for changes to network state, and the connection profile "NetworkStateChangeEventDetails" may be used to identify the details of any changes to network state.

Other operating systems may have corresponding mechanisms to identify networking changes. In an embodiment, AMD 304 may use network change events as triggers to perform active MITM detection methods in an efficient manner. In an embodiment, AMD 304 may periodically perform active MITM detection methods without triggering by a network change event. Certificate or key pinning is a well-known method in which an application has prior knowledge of pinning information, i.e., the certificates, or the certificate chain information, or the public key information contained in such certificates, that are considered allowable for connection to a particular destination host. If an application makes a network connection to a particular destination host and the received certificates or certificate chain information do not match the pinning information, the pinned network connection is said to fail. In an embodiment, AMD 304 may perform active MITM detection methods when a failure in making a pinned network connection to a server (e.g., security server 320) has been detected.

iii. Captive Portal Detection

From Android API level 23 and greater, it is possible to implement an Android activity that handles Captive Portal sign in.

While it is possible to actively monitor network connection status changes on iOS, there does not appear to be any direct feedback on the Captive Portal status of the network. If Captive Portal authentication is enabled, failing to authenticate causes the device to disassociate from the network. In an embodiment of Active MITM Detection on Connection, actively probing for Captive Portals may be performed.

A probe may be a request or sequence of requests made from AMD 304 to a server. In return, AMD 304 receives a response to the probe request. In an embodiment, a Captive Portal probe is performed by AMD 304 by AMD 304 making a network connection from AMD 304 on computing device 200 (the client) to a server to obtain a content response. Part or all of the content response may be compared to a known expected content response for that server. A server that is the target of a probe may be referred to as a probe endpoint server 330a-330b, or as a reference server. A probe endpoint server may be a server whose primary purpose is to field probe requests (a dedicated probe endpoint server), or may be any server on the network for which a known expected content response is available. For example, computing device 200 may record the content response from a prior request to any server, and then later use that same server as a probe endpoint server utilizing the recorded content response as the expected content response. Probe requests can use various protocols, such as DNS, HTTP, HTTPS, ESMTP, IMAP, POP3, or other protocols. Different protocols may be used to test, or probe, whether there is an active MITM on the network connection. A particular protocol may be used to probe whether there is an active MITM on the network connection that is processing that particular protocol and modifying responses to requests so that the responses differ from what is expected. In the following, a probe operation will be discussed using HTTP or HTTPS, but the method applies to probing using any protocol. Thus, not all probes are Captive Portal probes. The determination of Network Connection State may differ on different platforms. On some platforms, the Network Connection State may be determined by explicit actions taken by AMD 304, or determined by results observed by AMD 304. On other platforms the operating system may make Network Connection State information available directly via an API. The expected content response may consist of any combination of returned results, which in the case of an HTTP or HTTPS query may include an HTTP status code or content results (e.g., a particular html page and/or particular other HTTP header strings and/or particular strings within an html page) or both. In an embodiment, there is a requirement that a probe endpoint server responds with an HTTP status "200 OK" and also a response including particular known content (where the known content may be HTTP headers or HTML content or both). In this embodiment, the "200 OK" is the expected response, and, for example, the 3xx status codes are not expected and would involve redirection.

In a probe operation, an exemplary dedicated probe endpoint server to which an HTTP request is sent returns an HTTP "200 OK" status with known content. The dedicated probe endpoint server does not under any circumstances issue any other HTTP status code, including 3xx Redirection temporary success codes. Probe endpoint servers that are not dedicated probe endpoint servers may return other HTTP status codes. In an embodiment, a non-dedicated probe endpoint server (e.g., a reference server) issuing an HTTP status other than, e.g., "200 OK" will cause the system to stop using this probe endpoint server, and to choose an alternate endpoint server for probing operations.

When a network change is detected, AMD 304 enters a CAPTIVE_PROBE state. In this state AMD 304 probes for successful retrieval from a probe endpoint server by sending a request. If, when in this state, AMD 304 receives anything other than a HTTP "200 OK" status code with the expected content, AMD 304 transitions to an AWAITING_AUTHENTICATION state. If AMD 304 is able to successfully retrieve the expected content response of "200 OK," AMD 304 transitions to an ACTIVE state. In an embodiment, AMD 304 expects to receive a HTTP 204 NO_CONTENT status code. In other embodiments, any protocol, not just HTTP may be used by AMD 304 in sending a probe request, and status codes and responses are compared for a satisfactory match with expected status codes and response content.

While a connection is in the AWAITING_AUTHENTICATION state, active MITM events are not reported to administrators or users of computing device 200: the report of such events could be a false positive. However, in this state, computing device 200 may identify that the Captive Portal does intercept TLS communications, and in an embodiment may report this intercepted information to the end user or to an administrator or a server-side event store. In an embodiment, active MITM events detected while a connection is in the AWAITING_AUTHENTICATE state may be reported to administrators or users of computing device 200. In an embodiment, the report may be accompanied by a designation that the active MITM event detected represents a potential or actual false positive.

Once authentication has been received and a connection has been established with that network host, the connection state transitions to ACTIVE. Depending on the operating system, the indication that the network connection state has transitioned to ACTIVE may be available via API or by probing or testing. In such probing, a "200 OK" will generally not be received unless the network connection state is ACTIVE, thus "200 OK" implies ACTIVE.

iv. Active TLS Connection Testing

In an embodiment of Active MITM Detection on Connection, while a Wi-Fi connection is Active, AMD 304 may periodically probe a probe endpoint server that has known certificate properties, and a known TLS configuration. A TLS configuration may include: one or more of the values for CipherSuite, Protocol Version, and CompressionMethod (and other parameters as detailed in Internet Engineering Task Force (IETF) Request for Comments (RFC) 5246 The Transport Layer Security (TLS) Protocol Version 1.2); an extension; a list of extension data; and signature algorithms. AMD 304 receives a response including a retrieved test or expected document. The server configuration is such that AMD 304 will generally be expected to negotiate a strong cipher suite with known characteristics. In an embodiment, AMD 304 tests one or more endpoint configurations against the expected properties of each endpoint, as part of policies 318. In an embodiment, AMD 304 may use a history of known endpoint configurations and expected properties. For example, one of policies 318 may specify whether to use dedicated endpoints or the history of endpoints or a combination thereof, such as:

1. A fixed URL (hostname+endpoint) to test for secure (HTTPS) connection properties.
2. A fixed URL (hostname+endpoint) to test for non-secured (HTTP) connection properties.
3. One or more Subject Public Key Information (SPKI) Hash(es) authorized to verify the authenticity of the test endpoint.
4. A count of the expected HTTPS href links embedded in the retrieved test or expected document.
5. The SHA256 value of the retrieved test or expected document.
6. Expected TLS protocol version
7. Expected TLS cipher suite In the embodiment, AMD 304 may retrieve content from a predetermined URL on the probe endpoint server. In the case of a dedicated probe endpoint, this URL returns an HTTP "200 OK" response code with pre-determined content, and no redirects. The content retrieved from this URL is HTML content with secure links matching the count of links embedded in the expected content response. In the case of a probe endpoint server from a history from the client of previously connected servers, the same processing can proceed: (1) as long as a HTTP "200 OK" response code is received; (2) as long as any other pre-determined protocol message that performs substantially the same function is received, and the number of secure links in the retrieved HTML content matches what has been previously observed; or 3) any other pre-determined comparison of part or all of a probe response result matches conditions. If not, (1), (2), or (3), then a different probe endpoint server is selected to perform the probe. If HTTP response code other than "200 OK" is retrieved, AMD 304 chooses whether to retry, or to connect to a different probe endpoint server. How AMD 304 handles retries (including how many retry attempts) is preconfigured or is a decision made by AMD 304 based on a policy 318 locally resident on the device or obtained from security server 320. Any host on the internet may be used as a probe endpoint. In the case in which expected response content is not known for such a host, AMD 304 may request that security server 320 retrieve response content from the host, and send the response content to computing device 200 for comparison to what computing device 200 receives from its direct connection with the host. AMD 304 may also request that security server 320 retrieve response content from the host and that computing device 200 send its own received response content to security server 320 for comparison. In the case of a dedicated probe endpoint server, the expected content response (e.g., a document) may be preconfigured in advance, or may be sent to computing device 200 from security server 320 for comparison at computing device 200. Security server 320 may send both which probe endpoint server to use and also the expected content response. In the case of any other server, e.g., an arbitrary destination host, the comparison may be made either at the computing device or at the security server. In an embodiment, a policy regarding the minimum level of TLS protocol version and TLS cipher suite may be specified, and enforced on the network connection; a connection which does not meet the policy minimum level may be disconnected, or reported to a user of the device, or reported to a security server or reported to an administrator, or multiple of these actions.

In an embodiment, the AMD 304 connection may use a liberal configuration—that is, AMD 304 will allow any protocol version to be negotiated, and will allow a liberal set of cipher suites, both of which are specified as part of a ClientHello message that is the first step in a TLS handshake protocol. AMD 304 does not use any pinning for the connection. The liberal configuration of protocol versions and the liberal set of cipher suites are sent so that if there is an active man-in-the-middle (MITM), the MITM will have the opportunity to attempt to perform its "middling" operation, i.e., the operation it was intended to perform, such as: including changing protocols, downgrading security levels, and so on.

In an embodiment, the server configuration of a dedicated probe endpoint server may be extremely strict—for any given URL provisioned to clients, the dedicated probe endpoint server supports: a single host certificate configuration, a strict TLS configuration with limited acceptable versions, and a narrow set of high security cipher suites. The purpose behind being extremely strict is that there is no ambiguity in connections generated to the dedicated probe endpoint server. Dedicated probe endpoint server configurations may have different versions on different unique URLs, but once deployed, preferentially, the properties of connections negotiated to that dedicated probe endpoint server are fixed for all time.

In an embodiment, AMD 304 may request to load a static HTML page from an un-encrypted endpoint on the probe endpoint server. The "static HTML page" is a document which is part of the content response (which contains the HTTP status code, any optional HTTP headers, and the HTTP content (i.e., the document)). The static HTML page contains a fixed number of secure links consistent with a provisioned configuration of AMD 304, where the provisioned configuration was preconfigured from a policy, which either already exists on computing device 200 or was dynamically obtained from security server 320 by computing device 200. In an embodiment, AMD 304 parses this document, and counts the number of secure links encountered in the document. In an embodiment, AMD 304 compares a SHA256 hash of the received document with an expected SHA256 hash value. In an embodiment, other protocols, expected response status, expected response results, and comparison methods are used—any network protocol may be used that would give an expected response. For example: a DNS query that would be resolved by an enterprise domain server, e.g., a CNAME lookup for ran-domlygeneratednumber.example.com—this would not be cached by any intermediate DNS resolver because the "randomlygeneratednumber" part would never have been used in a DNS query to example.com, and thus the lookup would have to resolved by the authoritative DNS server for example.com.

AMD 304 verifies that received response code, content, connection (TLS) parameters, and secure link count match the expected content response. AMD 304 also evaluates the set of expected TLS parameters (e.g., TLS protocol version and cipher suites) and verifies that the expected parameter values (which should be the most secure ones) have been negotiated based on the capability of computing device 200. If the parameters of the negotiated connection are not the expected parameter values, the AMD 304 response is dependent on the connection state—AMD 304 takes no action regarding whether there is a MITM if the connection state is still in the AWAITING_AUTHENTICATION (captive portal) state. In an embodiment, AMD 304 verifies that the actual secure links encountered in the document have the same parameter values as the ones expected to be in the retrieved document.

v. Client Response

In an embodiment of Active MITM Detection on Connection, if connection anomalies (the results, e.g., the number of secure links, are other than expected) are observed in the AWAITING_AUTHENTICATION state, AMD 304 may choose to notify the end user that it appears the network Captive Portal is configured to intercept TLS connections against best practices. In such a case, AMD 304 does not necessarily need to notify security server 320 of the observed anomalies because these anomalies simply represent the normal operation of Captive Portals such as found in hotels or coffee shops. In an embodiment, AMD 304 does notify security server 320 of the observed anomalies, and optionally identifies them as being due to the presence of a Captive Portal.

If connection anomalies are observed in the ACTIVE state, AMD 304 records one or more of the following pieces of connection anomaly information:

1. The tested non-secure (HTTP) probe endpoint server.
2. Complete DER-encoded host certificates presented by the server as its certification path. (DER refers to Distinguished Encoding Rules, a subset of BER (Basic Encoding Rules), which is part of the ASN.1 standard for encoding abstract information into a concrete data stream, as specified in the ITU-T X.690 standard, and which is used to encode certificate related information as specified in the ITU-T X.509 standard, which is used in the TLS implementation to handle public key and certificate information).
3. The Subject Public Key Info (SPKI, as defined in the ITU-T X.509 certificate standard) Hash of all certificates on the presented certificate path identified as trusted by a TLS engine on the client. In an embodiment, hashes are computed using the public keys contained within fields nested within structures within the certificates, rather than "on" the certificates themselves.
4. The TLS protocol version negotiated.
5. The TLS cipher suite negotiated.
7. The Domain Name System (DNS) configuration (server IP addresses) of the network under test.
8. The IP address resolved for the probe endpoint server.
9. The Extended Service Set Identifier (ESSID) or Service Set Identifier (SSID) of the Wi-Fi network connected.
10. Whether the network is in Infrastructure or AdHoc mode.

11. The Hardware Media Access Control Address (MAC Address) or Basic Service Set Identifier (BSSID) of the Wi-Fi network connected (the BSSID may be the same as the MAC, or may be related to or derived from the MAC address in a vendor-specific manner).

12. The MAC address of default route/default gateway.

13. The enumerated connection properties that AMD 304 considers to be anomalous.

14. An indication of whether the anomaly was related to a known-pinned connection (some connections use "pinning" which means that AMD 304 knows in advance what the certificate information that is received in the TLS handshake protocol should be).

15. Any available data regarding a geographic location of computing device 200, or any data that can be correlated with a geographic location, which may include one or more of GPS coordinates, a list of BLUETOOTH or other beacons detected by computing device 200, a list of cell towers detected by computing device 200, a list of Wi-Fi networks detected by computing device 200 (including one or more of the Wi-Fi network SSID, BSSIDs, ESSID, and MAC addresses of the Wi-Fi access point detected), the received signal strength indicator (RSSI), or received channel power indicator (RCPI) from either cell towers or Wi-Fi networks detected.

In an embodiment, this recorded anomaly information may be reported to security server 320 as an "AnomalousTLSConnection," and the end user may be notified that network connections are likely unsafe. The determination whether to notify the end user of the device in this situation may be a matter of a user-configured preference, or an enterprise policy configured for the device. Information reported to security server 320 may be stored, or may be used to display or send an alert to an enterprise console, or a combination thereof. In an embodiment, the reporting of AnomalousTLSConnection information may be configured to use safe networks, or as a default behavior of AMD 304, or based on a user preference or a policy, or a combination thereof.

The determination whether to perform active MITM detection via Captive Portal probing may be preconfigured, or may be configured as a user preference, or may be a matter of an enterprise policy configured for the device, or may be triggered by security events detected at the device (including, e.g., the failure of a pinned connection, or a connection change), or may be triggered by policy-specified context information (e.g., active MITM detection may be specified to occur when the device is in a set of specific geographic locations (e.g., locations known not to be safe), also active MITM detection may be specified to occur when the device is not in a set of specific geographic locations (e.g., locations known to be safe)).

vi. Event Analysis

In an embodiment of Active MITM Detection on Connection, security server 320, or more specifically a security software component running on security server 320, may analyze a received security event to determine what types of anomalies may be present, e.g., the events listed in Table 2 under "Criteria and Interpretation." Based on the types of anomalies identified, the analysis identifies classes of attacks that are occurring. Specifically:

TABLE 2

| Classification | Criteria and Interpretation |
| --- | --- |
| ANOMALOUS_HOST_CERTIFICATE | Host certificates do not match expected trust chain. Indicates a potential host certificate hijacking attack. Falsified root certificate data can be acquired from information on trusted certificate path. If the falsified root was considered trusted by the client, it should be present in the identified trust anchors. |
| ANOMALOUS_PROTOCOL_PARAMETERS | TLS protocol or cipher suite downgrade attack. Details available in information received by the security server. |
| PROXY_PRESENT | A non-empty proxy list indicates that the attack may be via an attacker-controlled proxy (so-called 'SSL Bump' attack). |
| ANOMALOUS_IP_ENDPOINT | The IP endpoint of the server connection is not one that is expected by the security server's analysis infrastructure for the probe endpoint server. This may indicate a variation on the 'SSL Bump' type attack via DNS-based connection hijacking. |
| ANOMALOUS_LINK_PROFILE | An unexpected count of secure links indicates that so-called 'SSL Stripping' may be occurring against the probe endpoint server connection. Also, the actual content of the secure links in the retrieved document can be compared to the values expected to determine if changes other than changing 'https' to 'http' have occurred, e.g., changing a domain name to a look-alike domain name, as in changing 'https://www.example.com/' ('example' with a lower-case letter 'l') to 'https://www.examp1e.com' ('examp1e' with a digit '1' instead of a lower-case letter 'l'). |
| ANOMALOUS_ROOT_OF_TRUST | The certificate chain presented cannot be validated by the device's default trust store. This may be strengthened by a reputation/certificate store anomaly detection model. |

TABLE 2-continued

| Classification | Criteria and Interpretation |
| --- | --- |
| POLICY_DISALLOWED_ROOT_OF_TRUST | The certificate chain presented may in fact be validated by the device's default trust store, but an enterprise policy may prohibit the use of a particular certificate in the device's root of trust (certificate store) from being used at all, or from being used for connections to a specific set of destination hosts (e.g., the enterprise servers), or from being used for connections made by specific apps on the device (e.g., enterprise apps). |
| PINNED_CONNECTION_FAILED | A connection attempted to a destination host in which AMD 304 has a priori knowledge of the certificate chain to be received has failed due to a difference between the certificate chain received and the certificate chain expected, or optionally because minimum levels of cryptographic suite parameters are not present. |

Event data on anomalous connections may be collected by security server 320 for future research and analysis. Anomalous presented host certificates may be collected and stored as single instances for future security research, along with a reference to associated event data collected from the submitting or source client.

The methods described above regarding probe endpoint servers were discussed using HTTP or HTTPS protocols. Similar processes for connecting to probe endpoint servers using other protocols may be straightforward and accomplished in similar fashion. Example protocols are ESMTP, IMAP, POPS with STARTTLS or direct TLS connect, MSExchange. Also, rather than comparing the content in an HTML document retrieved from a probe endpoint server against expected content, other documents, e.g., mail messages, may be retrieved and their content compared with expected content, e.g., embedded HTTPS links.

B. Other Types of Man in the Middle Attacks and Detections or Safeguards i. ARP Spoofing Detection In an embodiment, a client-side proxy (CSP, e.g., CSP 310, FIG. 15) on computing device 200 may monitor ARP broadcasts (requests and responses) to detect if an ARP message has been broadcast specifying the device's IP address and a MAC address different from the device's MAC address, or if an ARP message has been broadcast specifying a previously known default gateway IP address and a different MAC address from what had been previously associated with that default gateway IP address. Detection of either of these may be a security event that triggers a configured user preference or enterprise policy regarding subsequent MITM detection or prevention activities on the device. In an embodiment, to identify patterns consistent with Layer 2 station interception techniques, CSP 310 or a security component (such as AMD 304) on computing device 200 may periodically analyze device ARP tables or monitor significant change events to those tables, or a combination of the two. Additionally, CSP 310 or the security component may query the ARP tables on the LAN gateway to determine whether ARP spoofing involving the device's IP address has occurred.

In an embodiment, CSP 310 on computing device 200 may compare the current default gateway MAC address with historical information that has an historical default gateway MAC address for a network of the same name (e.g., the same SSID as the SSID of the Wi-Fi network to which computing device 200 is currently connected) and at or near the same geographic location as the current geographic location of computing device 200. Such default gateway assignments, although they can change over time, tend to be persistent configurations, and thus a difference in the currently observed and historical default gateway address is a potentially suspicious security event that may trigger a configured user preference or enterprise policy regarding subsequent MITM detection or prevention activities on the device. In such an embodiment, the historical information may be stored on computing device 200 or stored at security server 320. The comparison is performed at computing device 200 by computing device 200 obtaining the historical information from security server 320, or is performed at security server 320 by computing device 200 sending the current information to security server 320. The historical information at security server 320 may be sent by a different computing device.

ii. Variations of Active Probe Endpoint Servers

In an embodiment, AMD 304 or CSP 310 may use connection endpoints from computing device 200's connection history as probe endpoint servers. In the embodiment, when computing device 200 connects successfully via a secure (TLS-secured) connection to a destination host (a connection endpoint), CSP 310 on computing device 200 stores information regarding that connection in a local computing device connection history store. The stored information may include any of the information mentioned above under the "Client Response" heading, such as the tested endpoint probe server name and address, the complete DER-encoded host certificates presented by the server as its certification path, the SPKI Hash of all certificates on the presented certificate path identified as trusted by the client TLS engine, the TLS protocol version negotiated, and the TLS cipher suite negotiated, etc. In an embodiment, CSP 310 may transmit information regarding that connection to security server 320. In an embodiment, an enterprise administrator may configure a special set of dedicated probe endpoint servers that are unique to that enterprise, and a list of the dedicated probe endpoint servers is then transmitted to or requested by computing device 200 (together with the expected status and results for probing each dedicated probe endpoint server on the list). In an embodiment, computing device 200 may dynamically modify the positions of the servers on the list, e.g., rotate them, or otherwise change the sequence of dedicated probe endpoint servers used. The list positions may be modified dynamically in a pre-arranged fashion or a random manner, or modified via instructions transmitted with the list from security server 320 to computing device 200. In an embodiment, security server 320 may store a list of other servers with expected status and results for probe requests to them, with these other servers being ordinary destination hosts on the internet. In an embodiment, security server 320 may include in the list of other servers, and along with the expected status and results for probe requests to them, information received from one or more computing devices. The information from the one or more computing device may include information they have recorded from successful connections to destination hosts. In an embodiment, security server 320 may include in the list of other servers, along with expected status and results, destination hosts to which security server 320 has made connections, including the recorded status and results from those connections. The recorded status and results may be recorded by the computing devices, the server, or both. In an embodiment, security server 320 may include in the list of other servers with expected status and results destination hosts to which security server 320 has made connections via one or more geographically distributed proxy servers, including the recorded status and results from those connections. In an embodiment, security server 320 may transmit the list of other servers with expected status and results, which are stored at security server 320, to computing device 200 for the computing device to use as probe endpoint servers. In an embodiment, any combination of probe endpoint servers, dedicated probe endpoint servers, enterprise specific probe endpoint servers, historical connection related probe endpoint servers, and other servers to be used as probe endpoint servers (as described above) may be used by AMD 304 or CSP 310 at computing device 200 according to a policy.

iii. Response to Inability to Communicate with Security Server

In an embodiment, a user preference or a policy, e.g., an enterprise administered policy, may determine that the occurrence of failed attempts by AMD 304 or CSP 310 to communicate anomalous or other connection information from computing device 200 to security server 320 is itself a security event that may trigger specific response actions. Specific response actions may include actions based on a user preference or enterprise administered policy that will prevent some or all subsequent network connections of this network connection. For example, in an embodiment a policy prohibits connecting on such a network to a list of enterprise destination hosts or services, or prohibits any network connections with any application from a list of enterprise applications running on the device. In an embodiment, AMD 304 or CSP 310 communicates anomalous or other connection information to security server 320 via a different network connection, such as by sending the information in an SMS text message via a cellular network connection.

iv. Verification of Connection Probing Process

In an embodiment, there may be a watchdog component running on computing device 200 (either as part of another application, or as part of an operating system watchdog service, or in a trusted execution environment) that examines the processes that are running the connection probing (including AMD 304 or CSP 310) and verifies that there has been no injection of other code, e.g., it verifies that the code image running in the process matches a predetermined hash of the code that is supposed to be running.

v. Periodic Probing

In an embodiment, the probing process may occur periodically from computing device 200. If the network to which computing device 200 is connected had previously been considered insecure, but the results from the most recent probing process show that the network is now secure, then a notice may be displayed on computing device 200 informing the user that the network is now safe. In an embodiment, a status icon may be displayed upon the device whose appearance indicates whether the currently connected network is secure or insecure.

vi. Enterprise-Sanctioned SSL intercept

Some enterprises intentionally perform SSL intercept (which is a form of MITM prevention intended to protect a device or network or enterprise) on devices used by an enterprise's employees or contractors or service providers, or on other devices that have been given access to resources of the enterprise, e.g., resources such as networks or services or applications. Because SSL intercept is itself a form of MITM attack, particularly Host Certificate Hijacking, the methods and system described herein for MITM detection or prevention will detect or block such valid enterprise SSL intercept activities. SSL intercept is commonly used to implement Data Loss Prevention (DLP) functionality, or to implement destination filtering to modify what destination hosts or services may be connected to by a device, or to implement content filtering to determine whether a particular piece of content is allowed to be received at computing device 200 for its intended delivery to a user of the device or for storage on the device, or to detect potentially harmful websites or applications being downloaded to a device, or for other reasons that require access to inspect the content of encrypted communications to or from a device. Typically, SSL intercept is performed in the network infrastructure, for example, in a router or firewall or dedicated network appliance.

Additionally, some applications on computing device 200 use certificate or key pinning, which is a method in which an application has prior knowledge of what certificates or certificate chain information is considered allowable for connection to a particular destination host. Such pinning would be broken by SSL intercept being active on a network connection.

In order to support valid enterprise SSL intercept activity, it is customary in the industry to create a whitelist to allow SSL intercept to function in the manner the enterprise desires. Such an SSL intercept whitelist contains a list of URLs or categories of URLs, or a list of cloud-based applications or cloud-based services or categories thereof. In an embodiment, a whitelist may include one or more certificates used by an enterprise for SSL intercept activity, or include information related to the certificates, such as a certificate chain, an SPKI hash, public keys used in the certificates, etc., or a combination of certificates and information. SSL intercept will be allowed for network connections to destinations that are represented in an SSL intercept whitelist. An SSL intercept whitelist of this sort may be used in conjunction with the methods for MITM detection, to both allow the interception to take place, and to prevent the generation of warnings or alerts to a user of computing device 200 that is having a whitelisted SSL intercept taking place for one of its network connections.

In an embodiment, unlike conventional solutions in which SSL intercept takes place in a piece of network infrastructure of a network to which computing device 200 is connected, a component executing on computing device 200 may perform SSL intercept on communications from or to that device. The embodiment may use any of the methods described herein for a client-side proxy (e.g., CSP 310). A CSP that is performing SSL intercept includes a CSP that is performing a service that requires SSL intercept, such as DLP or destination filtering or content filtering. The advantage of this approach over conventional solutions is that the SSL intercept processing takes place even when the device is not connected to an enterprise network that contains SSL intercept appliances.

In an embodiment, CSP 310 may perform all the processing for such a service entirely on computing device 200. In an embodiment, the CSP may offload the processing for such a service to security server 320, by sending all or a portion of the SSL intercepted data to security server 320. In this embodiment, the CSP may receive a response message from the server indicating a disposition of the connection or content, e.g., should it be allowed or blocked, should the user or a remote administrator be warned, etc. In an embodiment, when a communication is covered by an SSL intercept policy (i.e., the enterprise has specified the conditions under which the enterprise wishes to perform SSL intercept) computing device 200 routes the network connection from computing device 200 through a network location the enterprise has specified, where the enterprise has an SSL intercept network appliance or other piece of network infrastructure performing SSL intercept.

In an embodiment, an SSL intercept whitelist applies only to certificates that chain up to one or more particular certificates in computing device 200's certificate store, e.g., to the enterprise's certificate.

In an embodiment, an SSL intercept whitelist may also be based on which application on computing device 200 created a particular network connection. By various methods it is possible for the CSP to know which application on computing device 200 has created a particular network connection. In some operating systems there are APIs or data structures that have information related to the association between a particular network connection and the application to which the network connection belongs. In such a case the SSL intercept whitelist also specifies a list of applications or categories of applications running on computing device 200 for which SSL intercept is to be allowed.

In an embodiment, there may be an SSL intercept blacklist that determines when SSL intercept is not allowed to take place. For example, there may be a list of URLs or categories or URLs, or cloud-based applications or cloud-based services or categories thereof, or computing device applications or categories thereof, for which SSL intercept is not to be allowed. Entries in the blacklist may be included for different reasons. For example, for privacy or compliance reasons an enterprise may want to ensure that there is no SSL intercept of communications involving financial service cloud-based applications or websites, or SSL intercept of communications involving a user's personal medical or health information, such as communications dealing with fitness or wearable or health applications running on computing device 200. In an embodiment, there may be both an SSL intercept whitelist and an SSL intercept blacklist.

In an embodiment, the user of computing device 200 may be informed via a notification or display on computing device 200 that an enterprise configured SSL intercept is taking place on the connection. In an embodiment, the notification or display includes an option for the user of computing device 200 to disconnect that network connection.

C. Detection of Configuration on a Computing Device

Computing device 200 has certificates installed in the device's trusted certificate store. An anomalous root certificate may have been installed on the device, e.g., via a configuration profile. A user of the device may have been tricked into installing the anomalous root certificate, or may not have realized that the presence of the anomalous root certificate could lead to a compromise of the security of network connections from the device. In an embodiment, there may be user settings, or one or more administered policies, that specify one or more of: whitelists of certificates that are allowed to be used on a device; blacklists of certificates that are not allowed to be used on a device (even though they are installed in the device's trusted certificate store); default actions to be taken for a certificate not on either a whitelist or a blacklist.

In an embodiment a whitelist may include a specification of contextual information that modifies the applicability of the whitelisted certificate. Examples of such contextual information include: which application running on computing device 200 has initiated or received the network connection that is using the certificate; which cloud-based application or website is using the certificate; and which network identifier is being used for the connection. In an example, a particular certificate (an enterprise certificate) is specified in a whitelist that restricts the use of the certificate to: a particular list of enterprise applications; or a particular list of cloud-based applications or websites or web services associated with the enterprise. In a situation in which a user of computing device 200 is performing work with more than one enterprise, such a whitelist rule enables enterprise A's certificate to be used in conjunction with enterprise A's: CAPPs, cloud-base applications, websites, and web services. Such a whitelist rule, used in conjunction with a blacklist rule (as described below) prevents a certificate for enterprise B that is on computing device 200 from being used for connections related to enterprise A's: CAPPs, cloud-base applications, websites, and web services.

In an embodiment, a policy may have a blacklist of certificates that, even though they reside in a device's trusted certificate store, are not allowed to be used in making secure connections. An example is a root certificate from a certificate authority that has been a victim of a data breach compromising that root certificate. In an embodiment, a blacklist may include a specification of contextual information that modifies the applicability of a blacklisted certificate. Examples of such contextual information include: which application running on computing device 200 has initiated or received the network connection that is using the certificate; which cloud-based application or website is using the certificate; and which network identifier is being used for the connection. In an embodiment, a blacklist with contextual information may have a wild-carded specification for the contextual information. For example, using the example above in which enterprise A desires to protect connections to its CAPPs, cloud-base applications, websites, and web services, enterprise A has a blacklist with a wildcard specification of "*" (which matches all certificates not already matched by a whitelist) that identifies enterprise A's CAPPs, cloud-base applications, websites, or web services. The effect of the whitelist for enterprise A's certificate for these applications and a blacklist for all other certificates for these applications is to prevent any certificate other than enterprise A's from being used in conjunction with enterprise A's CAPPs, cloud-base applications, websites, and web services.

In an embodiment, a certificate blacklist policy that prohibits the use of a certificate in any circumstances may be used by computing device 200 to remove the blacklisted from the device's trusted certificate store. In an embodiment, the detection of a blacklisted certificate on computing device 200 by AMD 304 may cause AMD 304 to communicate with security server 320 to instruct a Mobile Device Management (MDM) service to push instructions to computing device 200 to remove the certificate in question.

D. Detection of a Possible MITM in the Environment

In an embodiment, when AMD 304 has detected a possible MITM in a particular geographic location, it may report all the related connection anomaly information about the possible MITM to security server 320. When any computing device, not necessarily computing device 200 that reported the connection anomaly information to security server 320, is in a particular geographic location and attempting to make a network connection, that device's AMD may obtain the historical record of connection anomaly information related to a region including or nearby the particular geographic location. Using that obtained connection anomaly information, AMD 304 may determine if a network connection has been made or is being attempted that shares characteristics with the historic connection anomaly information, e.g., the same BSSID or MAC address is being used. AMD 304 uses this shared characteristic to determine whether the completed or attempted network connection is compromised by a previously seen MITM. In this case AMD 304 warns a user of computing device 200, or reports the occurrence to security server 320, or breaks or prevents the connection, or several of these actions in combination.

In an embodiment, even if AMD 304 has not determined that a current network connection shares a characteristic with historical connection anomaly information, AMD 304 may warn a user of computing device 200 that this geographic location has previously been the site of an MITM detection. In an embodiment, a risk level related to network connections made while the device is in the geographical region may be raised, and the raised risk level may be used to trigger other MITM detection or prevention methods.

2. Response to Detection

AMD 304 on computing device 200, in response to the detection of a possible or actual MITM on a network connection, may display a warning on computing device 200, or send an indication to security server 320, or block the network connection, or initiate other methods of MITM prevention as described herein.

A. Warnings on Computing Device or Console

Figure 5B:
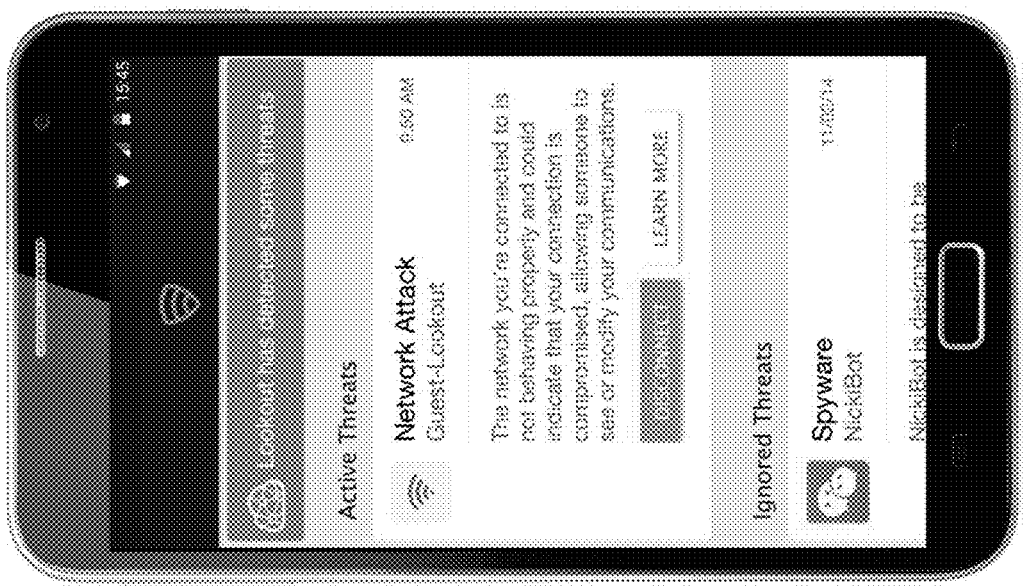
FIGS. 5A and 5B illustrate a computing device displaying a status message regarding a network to which the computing device is connected, according to an embodiment.
Figure 5A:
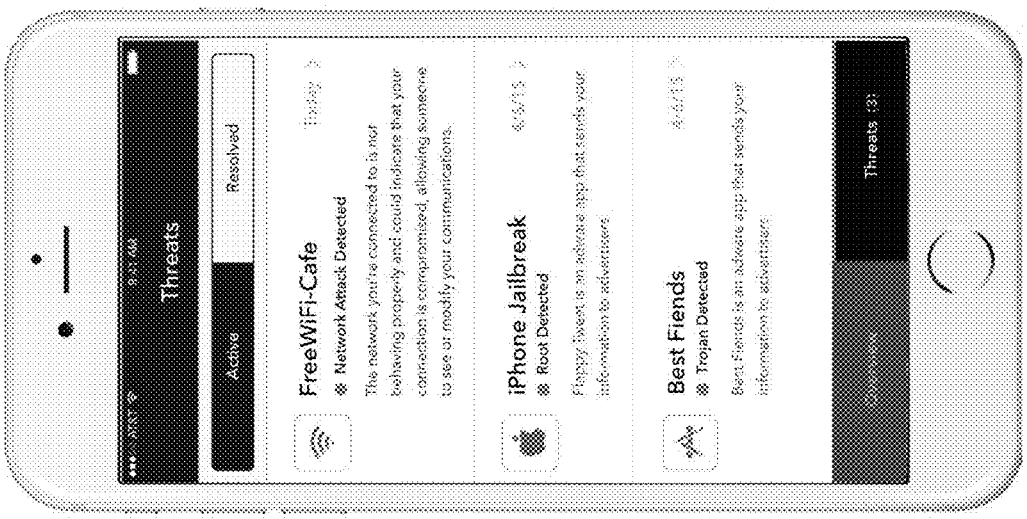

FIGS. 5A and 5B show examples of displays on a computing device that state that the network to which computing device 200 is connected is not behaving properly and this could indicate that the computing device connection is compromised. Such displays allow someone to see or modify communications from computing device 200. FIG. 5A is a display on an iOS device. FIG. 5B is a display on an Android device.

Figure 6B:
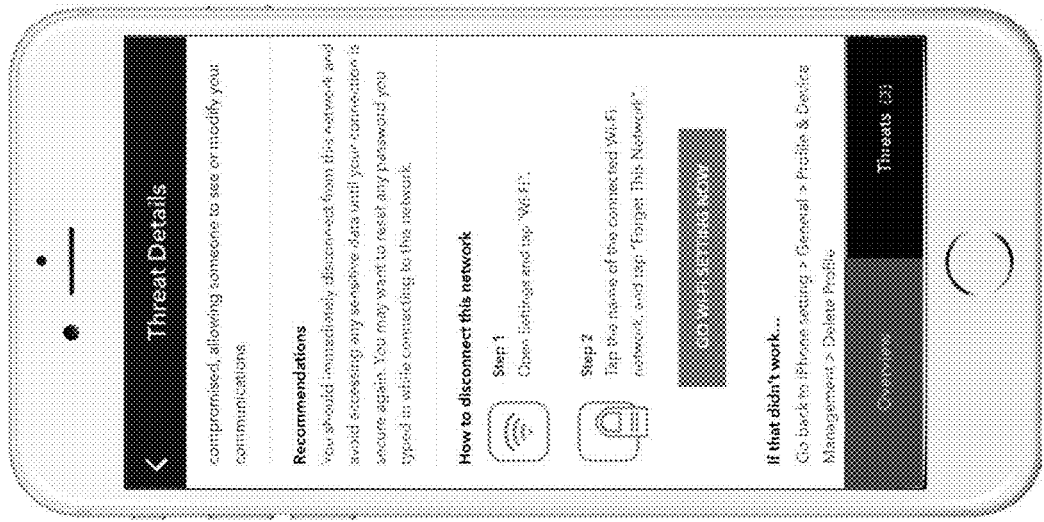
FIGS. 6A and 6B illustrate a computing device displaying a message regarding a network, to which the computing device is connected, and recommendations and instructions, according to an embodiment.
Figure 6A:
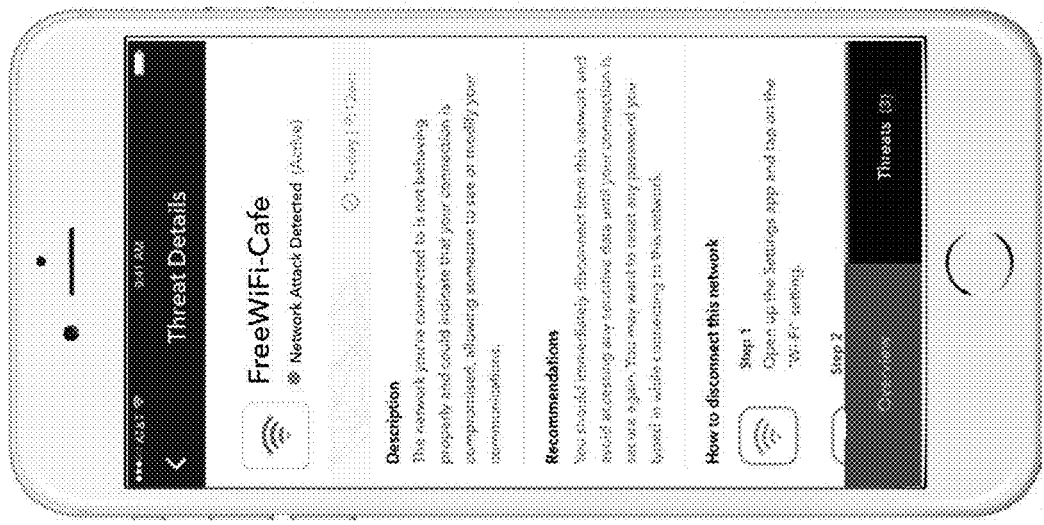

FIGS. 6A and 6B show examples of displays on a computing device that state that the network to which computing device 200 is connected is not behaving properly and this could indicate that the computing device connection is compromised. Such displays allow someone to see or modify communications from computing device 200. The displays also provide recommendations and instructions regarding how to disconnect from the network.

The recommendations may include one or more of, e.g.: recommending that the user should immediately disconnect from the currently connected network; that the user should avoid accessing any sensitive data until the computing device connection is secure again; that, if the user installed a configuration profile as part of connecting to the network, the user should remove that profile; and that the user may want to reset any password the user typed in while connecting to the network.

The instructions on how to disconnect from the network may include, e.g.:

TABLE 3

| | |
|---|---|
| Step 1 | Open Settings and tap "Wi-Fi". |
| Step 2 | Tap the name of the Wi-Fi network you are connected to and tap "Forget This Network". |
| Step 3 | Go back to Settings and tap "General", then "Profiles & Device Management" and uninstall any newly installed configuration profiles, if there are any. |

This display panel may be used for problems detected with a Wi-Fi or other network connection.

Figure 6D:
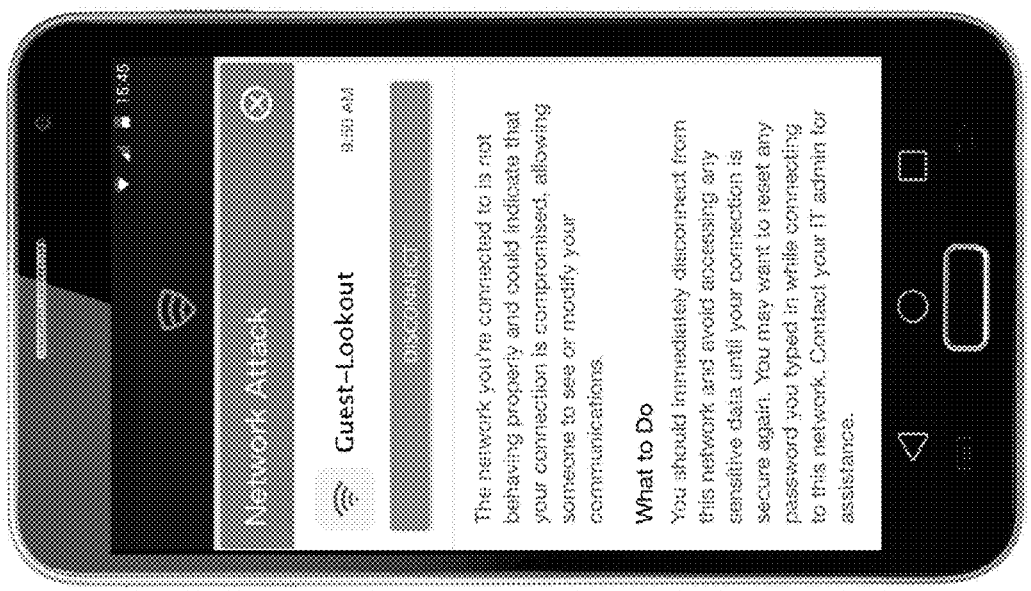
FIG. 6D illustrates a computing device displaying a message regarding a network to which the computing device is connected, and recommendations, according to an embodiment.
Figure 6C:
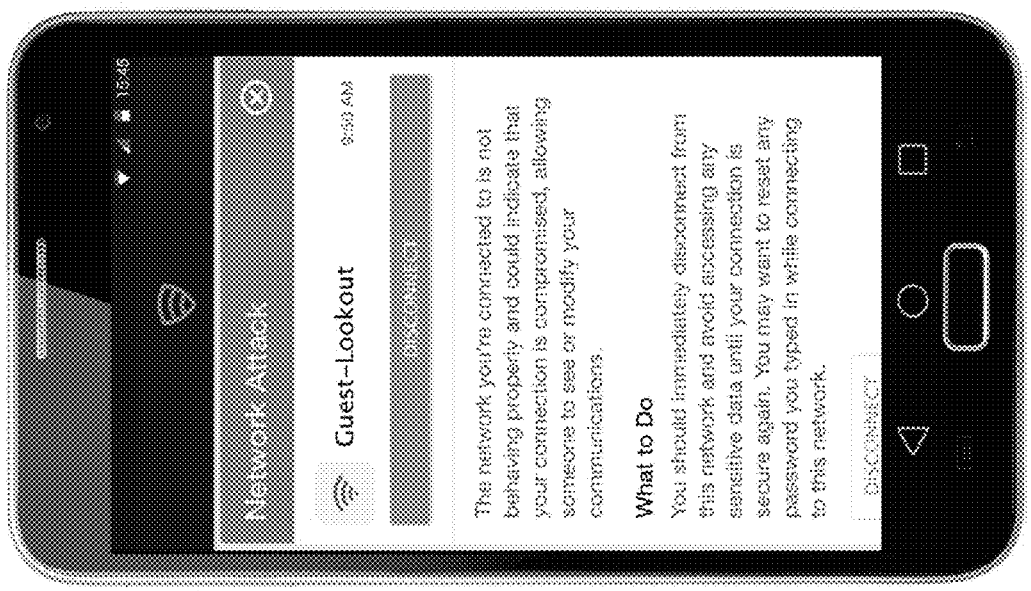
FIG. 6C illustrates a computing device displaying a message regarding a network to which the computing device is connected, and recommendations and a disconnect button, according to an embodiment.

FIG. 6C shows an example of a display on a computing device that state that the network to which the computing device is connected is not behaving properly and this could indicate that the computing device connection is compromised. Such a display allows someone to see or modify communications from computing device 200. The display could also provide recommendations and a button to disconnect from the network.

The recommendations may include one or more of, e.g.: that the user should immediately disconnect from the currently connected network; that the user should avoid accessing any sensitive data until the computing device connection is secure again; and that the user may want to reset any password the user typed in while connecting to the network. The button labeled "disconnect" when pressed disconnects computing device 200 from the network.

FIG. 6D shows an example of a display on a computing device that states that the network to which computing device 200 is connected is not behaving properly and this could indicate that the computing device connection is compromised. Such a display allows someone to see or modify communications from the computing device. The display also provides recommendations.

The recommendations may include one or more of, e.g.: that the user should immediately disconnect from the currently connected network; that the user should avoid accessing any sensitive data until the computing device connection is secure again; that the user may want to reset any password the user typed in while connecting to the network; and that the user should contact the user's IT admin for assistance.

Figure 7:
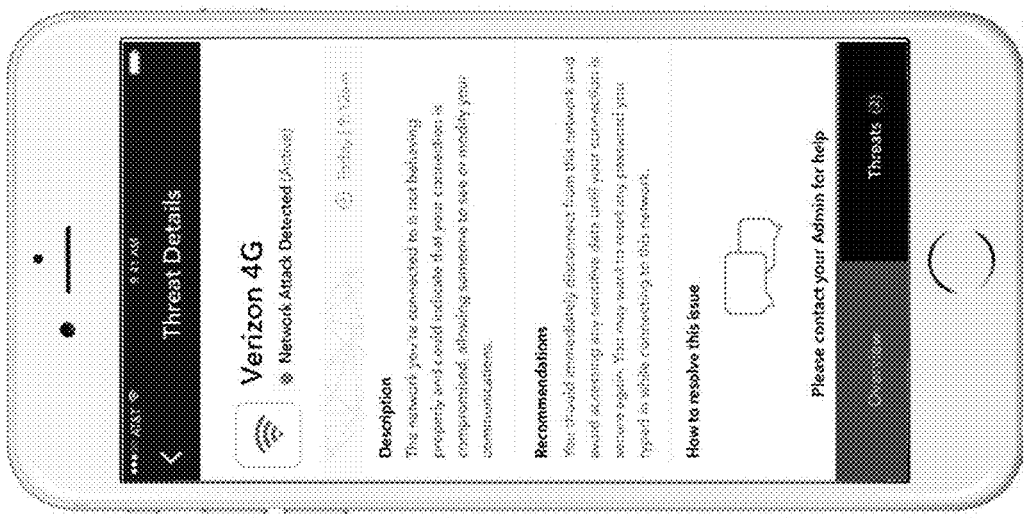
FIG. 7 illustrates a computing device displaying a message regarding a network to which the computing device is connected, and recommendations, according to an embodiment.

FIG. 7 shows an example of a display on a computing device that states that the cellular network to which computing device 200 is connected is not behaving properly and this could indicate that the computing device connection is compromised. Such a display allows someone to see or modify communications from computing device 200. The display also provides recommendations and instructions how to disconnect from the network.

The recommendations may include one or more of, e.g.: that the user should immediately disconnect from the currently connected network; that the user should avoid accessing any sensitive data until the computing device connection is secure again; that if the user installed a configuration profile as part of connecting to the network, that the user should remove that profile; that the user may want to reset any password the user typed in while connecting to the network; and that the user should contact the user's Administrator for help.

Figures 8A, 8B:
FIGS. 8A and 8B illustrate a computing device displaying a status regarding a resolved network threat, according to an embodiment.

FIG. 8A shows an example of a display on a computing device showing resolved threats. The display states that a network to which computing device 200 is connected is not behaving properly and this could indicate that the computing device connection is compromised. Such a display allows someone to see or modify communications from computing device 200. The display also indicates that the network attack has been removed, e.g., by disconnecting from the network.

FIG. 8B shows an example of a display on a computing device showing resolved threats. The display states that a network to which computing device 200 is connected is not behaving properly and this could indicate that the computing device connection is compromised. Such a display allows someone to see or modify communications from computing device 200. The display also indicates that the network attack has been resolved, e.g., by disconnecting from the network.

Figure 9B:
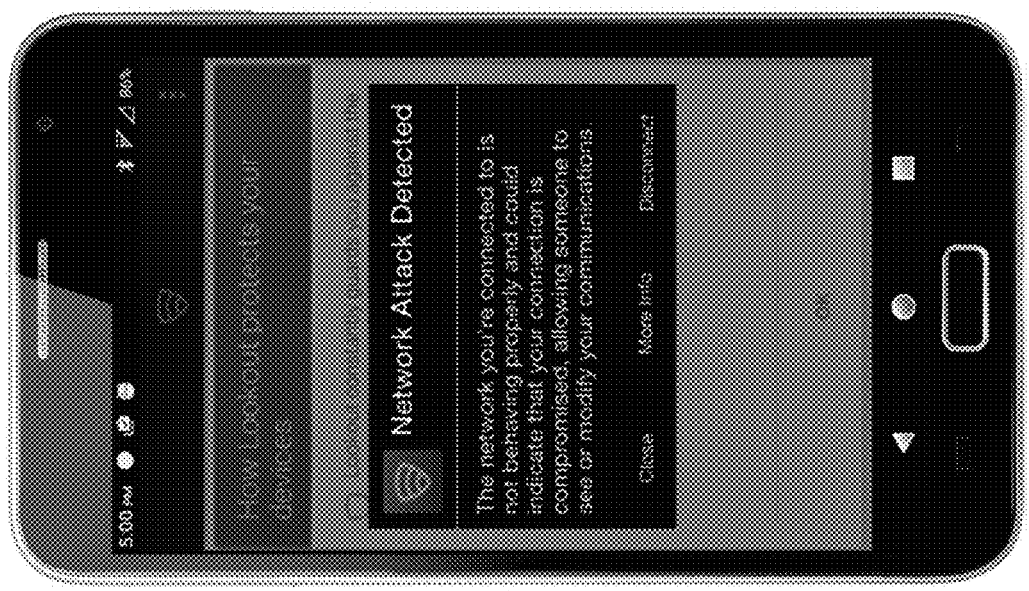
FIGS. 9A and 9B illustrate a computing device displaying a notification that a network attack was detected, according to an embodiment.
Figure 9A:
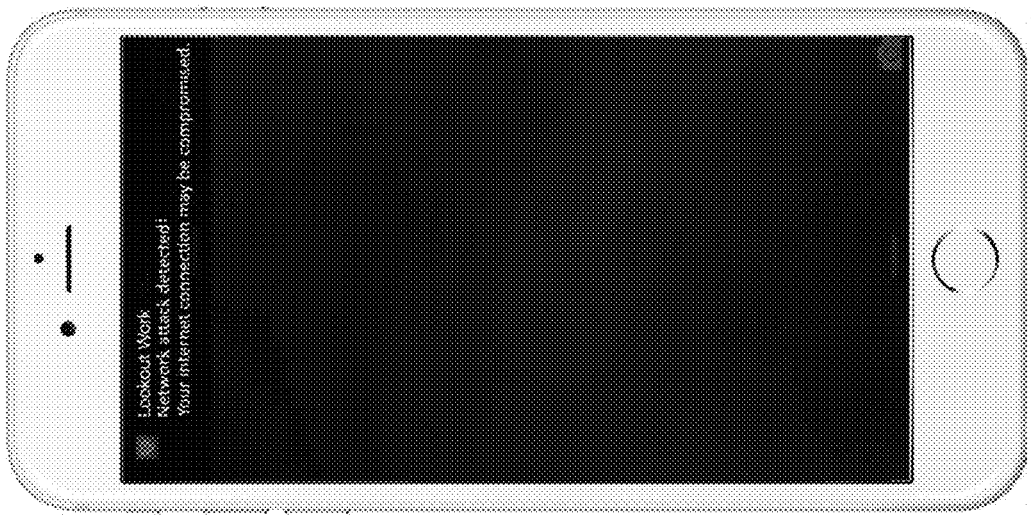

FIG. 9A shows an example of a display on a computing device that states that a network attack was detected, and that the internet connection might be compromised.

FIG. 9B shows an example of a display on a computing device that states that a network to which computing device 200 is connected is not behaving properly and this could indicate that the computing device connection is compromised. Such a display allows someone to see or modify communications from computing device 200. The display also shows options to a user of computing device 200 to close the alert, or to obtain more information, or to disconnect from the network.

Figure 10:
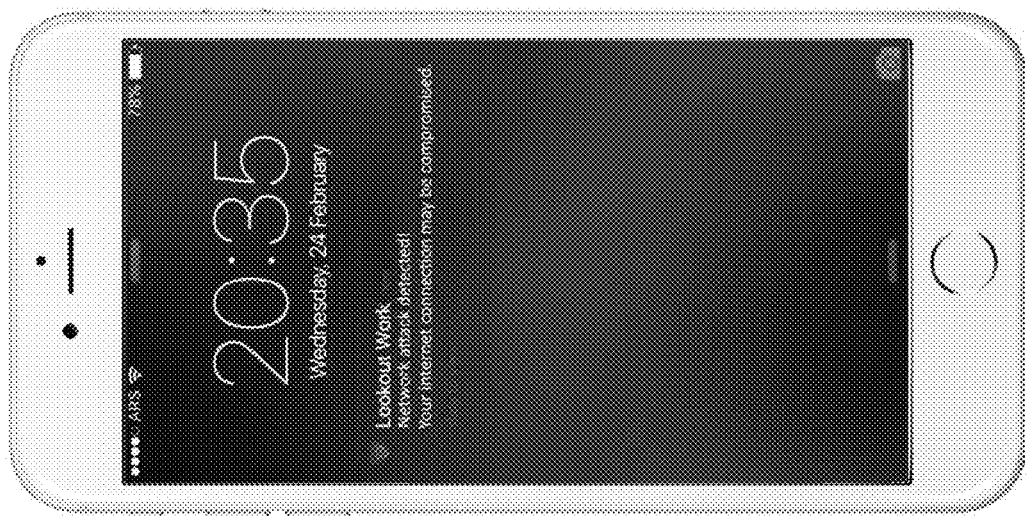
FIG. 10 illustrates a computing device displaying a notification upon a lockscreen that a network attack was detected, according to an embodiment.

FIG. 10 shows an example of a display on a computing device showing a notification on the lock screen of the computing device. The display states that a new threat was found on computing device 200.

Figure 11:
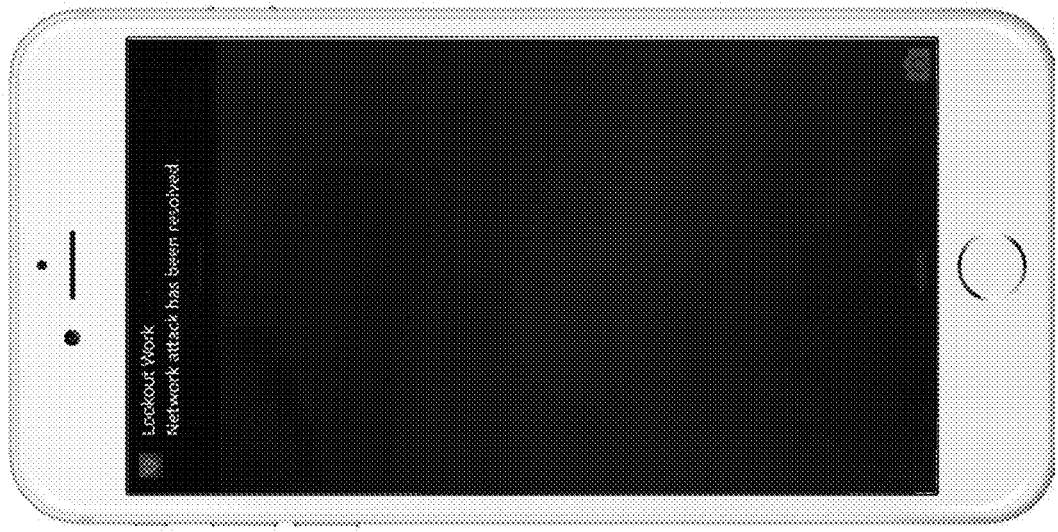
FIG. 11 illustrates a computing device display a notification that a network to which the computing device is connected is safe, according to an embodiment.

FIG. 11 shows an example of a display on a computing device showing a notification on the computing device indicating that the network to which computing device 200 is connected is now safe, stating that the network attack has been resolved.

Figure 12:
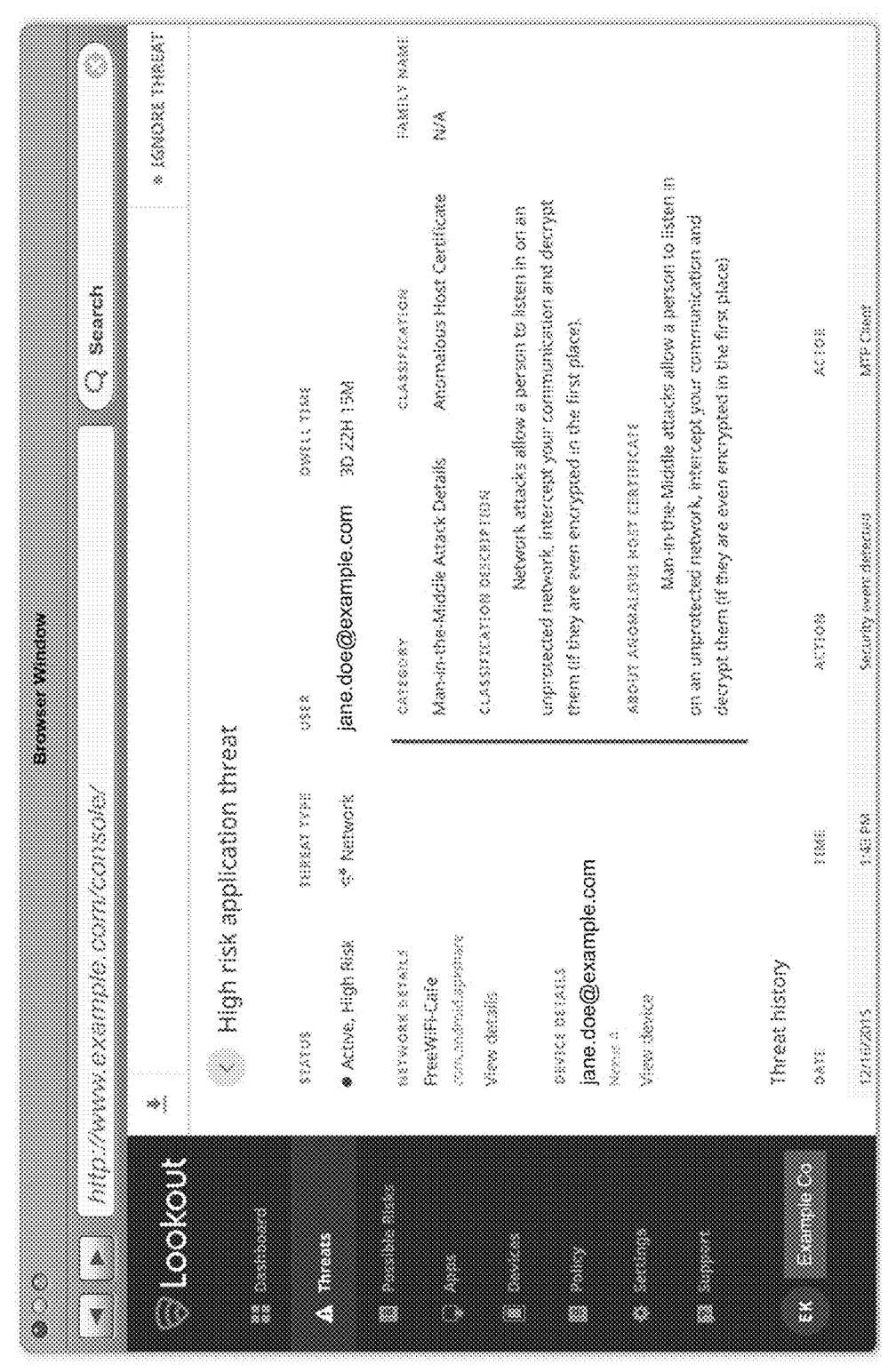

FIG. 12 illustrates an administrator display showing the details of an active high risk application threat in the category of a MITM Attack.

Figure 13:
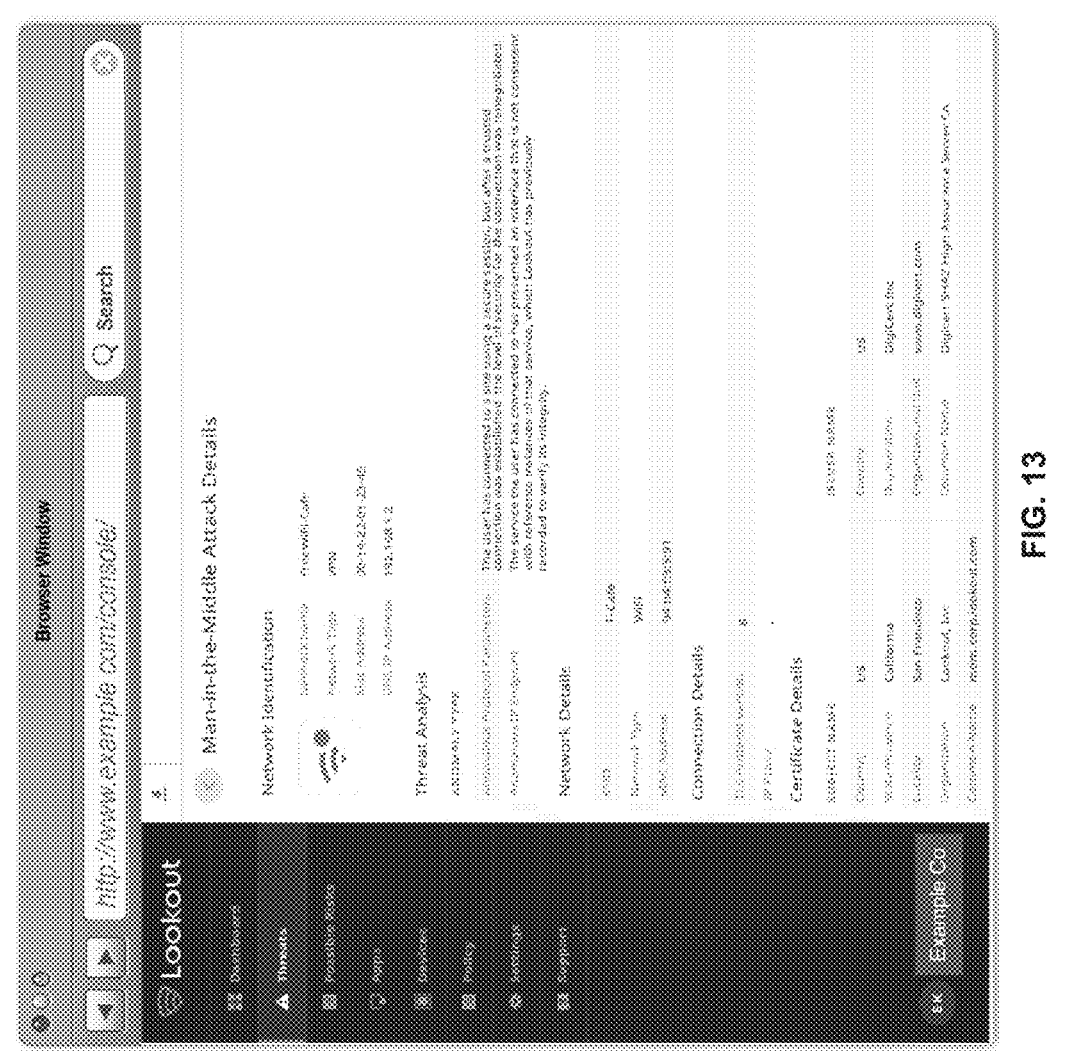

FIG. 13 illustrates an administrator display showing the details of a MITM Attack.

Figure 14:
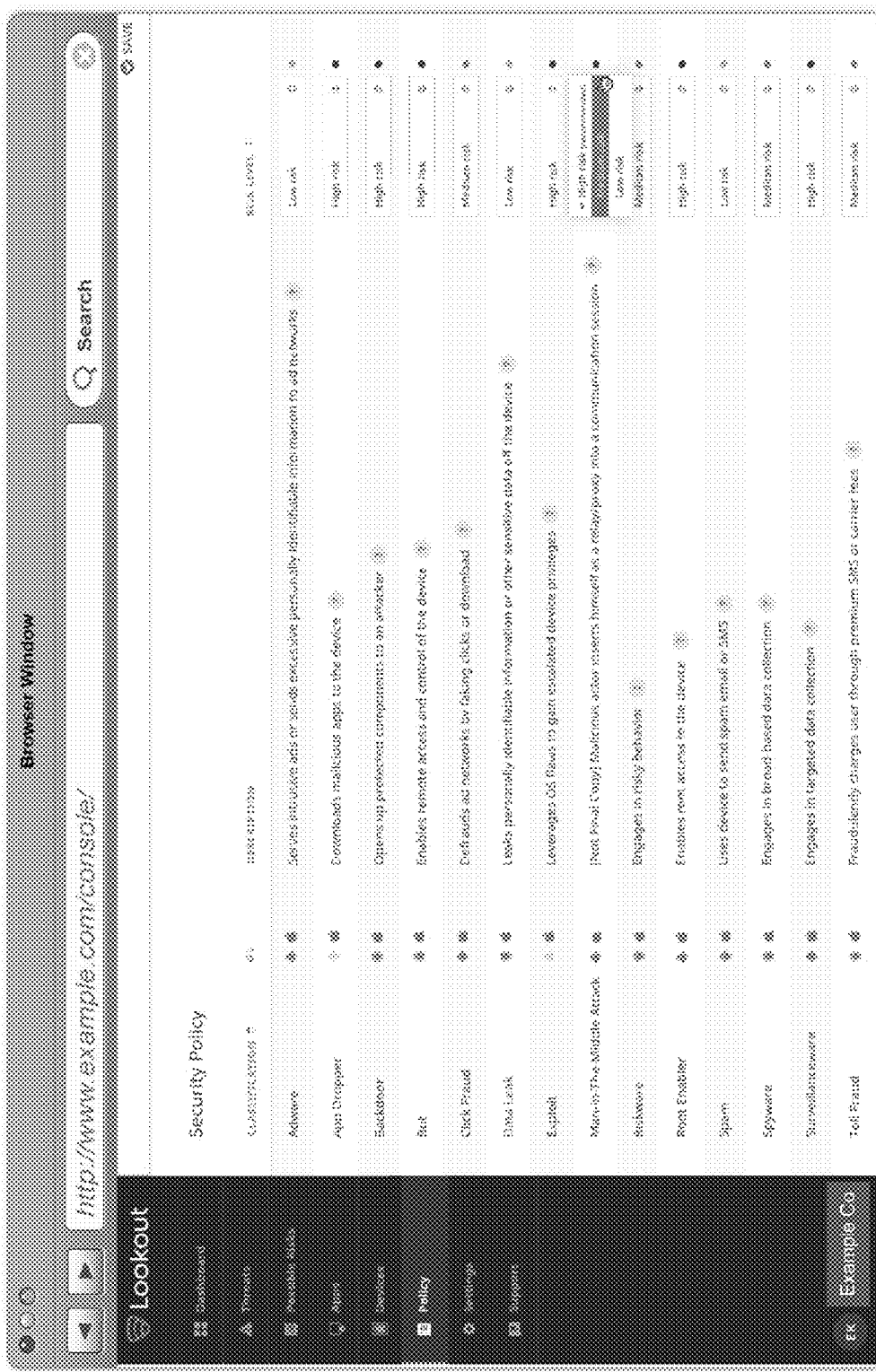
FIG. 14 illustrates an administrator display on which an administrator can specify Security Policy risk levels for threats, according to an embodiment.

FIG. 14 illustrates an administrator display on which an administrator may specify Security Policy risk levels for threats.

B. Blocking Communications

In an embodiment, AMD 304, upon detection of a possible or actual MITM on a network connection, may terminate the network connection.

C. Re-Routing Communication via an Alternate Channel

In an embodiment, AMD 304 may make a new network connection with a higher level of security. The connection may be made by, e.g.: tunneling the desired network connection through an encrypted connection to a server; using a pinned certificate to create the encrypted communication; or by changing the physical network connection, such as switching from a Wi-Fi connection to a cellular data connection.

D. Presenting an Option to Continue to the User of the Device

In an embodiment, AMD 304 may present to a user of computing device 200 an option to continue to use the potentially compromised network connection. If the user selects the option to continue, then the network connection will continue to be used. In such a situation AMD 304 may send a report of the user choice to security server 320.

E. Policy-Based Response Using Other Criteria

In an embodiment, AMD 304 may operate according to a set of user preferences or administered policies (e.g., policy 318) that detail specific circumstances that can determine an AMD 304 response to the detection of a possible or actual MITM on a network connection. The term "policies" may refer to either configured user preferences or administrator-configured policies, or a combination thereof. Policies may be: resident on computing device 200; stored on security server 320; transmitted from security server 320 to computing device 200 on demand, or via push from security server 320, or periodically; cached on computing device 200 and refreshed from security server 320; or combinations of the above. In an embodiment, a policy may be implemented based on contextual information specifications. Such specifications may include: the name or identification of an application or service on computing device 200 that is using a network connection; the name or identification of a cloud-based application or website or destination host that is the endpoint of the network connection; an identifier of the network connection (such as SSID, ESSID, BSSID, etc.); or information regarding the content of the communication (e.g., whether the content being transmitted or received contains sensitive information, such as enterprise information or Personally Identifiable Information (PII)).

In an embodiment, policy 318 (or policies 318) may specify one or more actions that are to be taken in response to an MITM detection by AMD 304 or CSP 310 on computing device 200. In an embodiment, an action to be taken in response to an MITM detection by an AMD 304 or CSP 310 on computing device 200 may be to disable certain functionality of computing device 200. The functionality to be disabled may be specified as, e.g., a list of CAPPs that are allowed to run and all others are not allowed to run, or a list of CAPPs that are not allowed to run (for example a list of enterprise CAPPs) and all other CAPPs are allowed to run, and the action may include the selective disabling of one or more components or sensors of computing device 200.

In an embodiment, a policy may specify an action that facilitates forensic investigation regarding a detected MITM. The action facilitating forensic investigation regarding the detected MITM may include incorporating watermarks into data that is transmitted by computing device 200, or deliberately streaming out watermarked data. Watermarking the data, such as adding watermarks in photographs or images, facilitates the subsequent detection of the data. In an embodiment, computing device 200 detects such a watermark in data, and notifies an authorized user or an administrator, where such notification may include part or all of the watermarked data. The watermarked data may include one or more of the data items previously referred to as AnomalousTLSConnection Information.

3. Prevention of MITM

Figure 15:
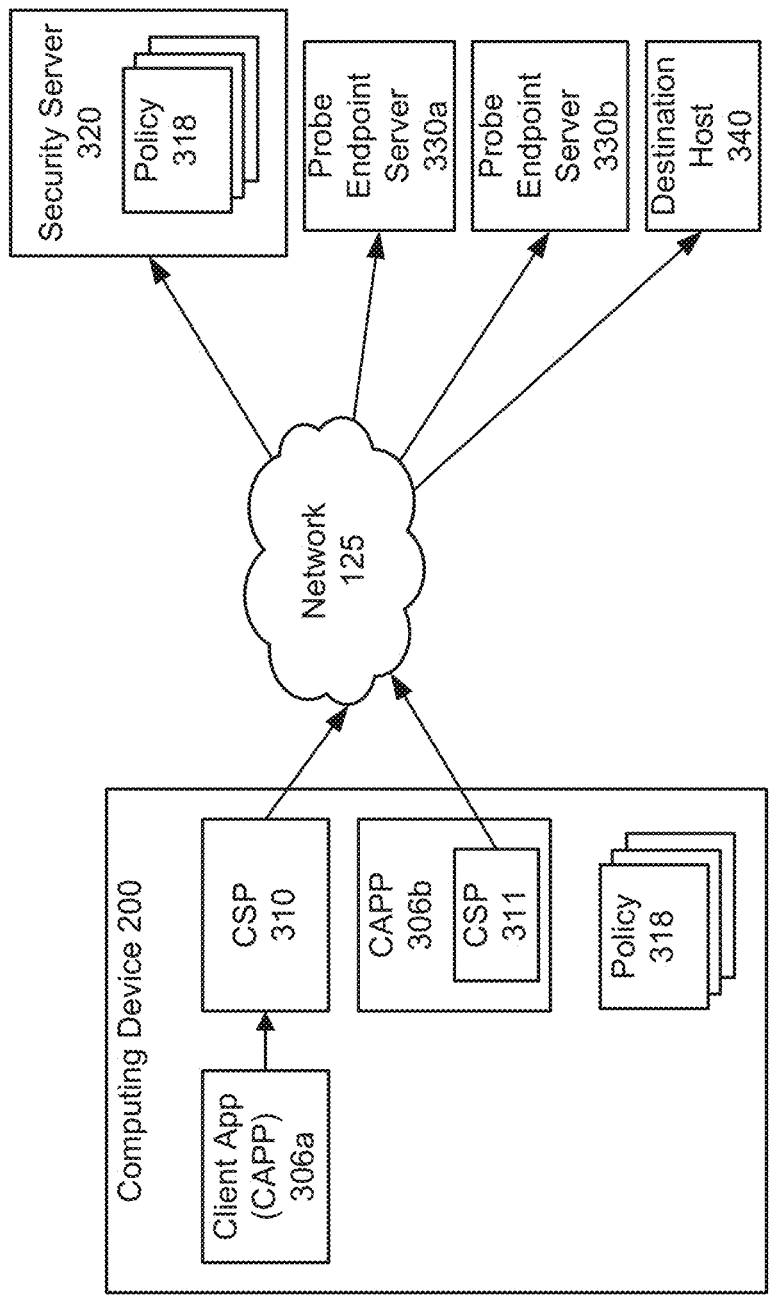
FIG. 15 shows an exemplary block diagram of an embodiment of another system for detecting and preventing network connection compromise.

FIG. 15 shows an exemplary block diagram of an embodiment of another system for detecting or preventing network connection compromise. A computing device 200 may contain one or more Client Applications (CAPP) 306a, each of which may be a stand-alone installed application, or a component of another application, or a component of the operating system, or a component of software running on a baseband processor of computing device 200, or involve components in a combination of the above locations.

The term CAPP also may include application code that is running on computing device 200, even though it may have not undergone a formal installation process, as is the case for Instant Apps on Android, or code delivered using Apple App Thinning to iOS devices, or the like. These pieces of application code are downloaded and executed on demand, and constitute only part of a complete application. The term CAPP also refers to executable code, such as Javascript code, that is contained in or included by a web page or a web application that is running on computing device 200 (e.g., in a web browser or in a web view hosted by another client application) and that has the ability to initiate a network communication by various means. Such ability to initiate a network communication may include: by modification of the Document Object Model (DOM) in the browser to change or introduce an element that the browser will fetch over the network; or by various APIs that can initiate network communications (e.g., xmlhttp, WebRTC, etc.). The term CAPP also refers to executable code (such as Javascript code) that is part of a plugin or extension running as part of a web browser and that executes in the context of different web pages or web applications, and that initiates or uses a network communication. A CAPP may be referred to in a policy by the CAPP name, or the CAPP signer, or by a hash of the CAPP contents, or by the network origin of the CAPP (e.g., if it has been downloaded), or by any other attributes, metadata, or characteristics of the application including its declared permissions or what capabilities it is determined to have by analysis of the application, or historical behavioral information that has previously been collected or determined for the application, including what network endpoints the CAPP connects to.

In an embodiment, computing device 200 may also contain a Client-Side Proxy (CSP) 310, also referred to as a transparent proxy, that processes network connection requests and network communications to and from a CAPP. CSP 310 may use an architected feature of the underlying operating system to proxy network communications, or may be part of a network device driver running on a baseband processor that is part of computing device 200, or may be included with an application as a component, as in a CSP 311 included as part of CAPP 306b. In the embodiment, any communication to or from a CAPP goes through CSP 310, which inspects the network communications content, or modifies it, or makes or breaks network connections, or re-routes communications through a different network connection.

The remaining elements of FIG. 15 (policies 318, network 125, security server 320, probe endpoint servers 330a-330b, and destination host 340 (DESTHOST)) are the same as described in FIGS. 1-4.

Figure 16:
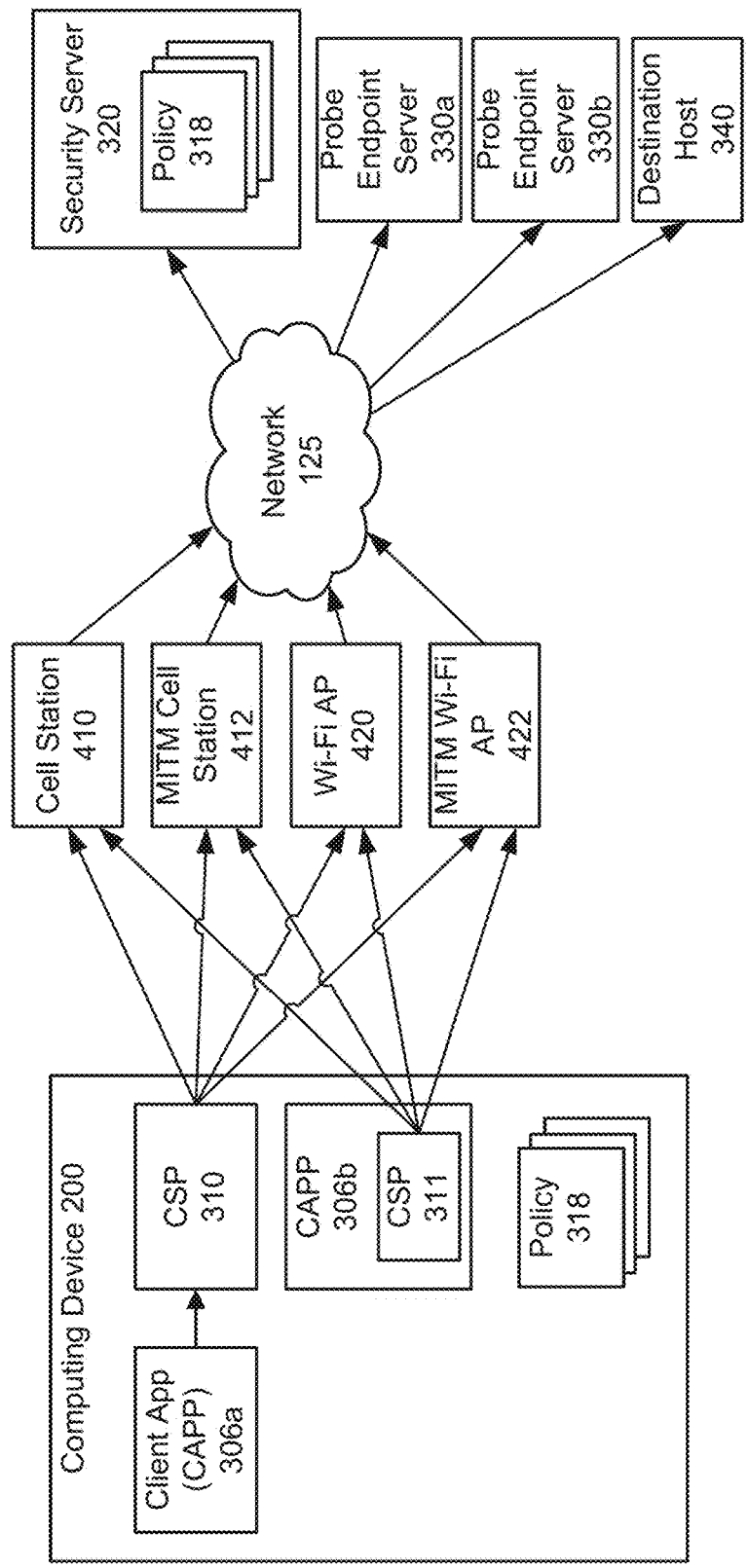
FIG. 16 shows a more detailed block diagram of an embodiment of another system for detecting and preventing network connection compromise, showing first hop network points of cell stations and Wi-Fi Access Points (APs).

FIG. 16 shows a more detailed block diagram of an embodiment of another system for detecting and preventing network connection compromise by, e.g., a MITM attack. FIG. 16 shows first hop network points of cell stations 410, 412 and Wi-Fi Access Points (APs) 420, 422. Cell station 410, MITM cell station 412, Wi-Fi AP 420, and MITM Wi-Fi AP 422 are the same as described in FIG. 4. The remaining elements of FIG. 16 are the same as described in FIG. 15.

In an embodiment, a CSP may operate in three modes: (1) no crypto mode, in which a CSP, e.g., CSP 310, does not have any special capabilities or privileges or access to cryptographic material for deciphering encrypted communications; (2) crypto certificate mode, in which there is a certificate installed in the trusted certificate store of the device (the CSP, e.g., CSP 310, uses the certificate to create DESTHOST specific certificates that chain up to the certificate installed in the trusted certificate store of the device); and (3) crypto participant mode, as in CSP 311 that is part of CAPP 306b, in which the CSP has access to the information involved in the creation of an encrypted communication from CAPP 306b, such as a TLS session key and TLS session ID or session resumption ticket. CSP 311 included in CAPP 306b is a type of CSP 310 and may also the capabilities of CSP 310 in addition to those attributed specifically to CSP 311.

In mode (1) no crypto mode, CSP 310 may only inspect or modify the content of unencrypted communications. Note that this includes the contents of the messages sent during the TLS handshake protocol (as defined in Internet Engineering Task Force (IETF) Request for Comments (RFC) 5246 "The Transport Layer Security (TLS) Protocol Version 1.2"). During the TLS handshake protocol a certificate or certificate chain for a destination host are sent from the destination host to CSP 310. In an embodiment, CSP 310 may inspect the certificates for anomalies (such as invalid values in certificate fields, or expired certificates) and may interrogate locally cached or remote certificate revocation list information. In an embodiment, anomalies in certificates may be reported to security server 320, and CSP 310 may display a warning on computing device 200, or break the network connection, or a combination thereof.

In modes (2) crypto certificate mode and (3) crypto participant mode, CSP 310 may also inspect or modify the content of encrypted communications. For mode (2), this is possible because CSP 310 essentially performs its own MITM operation between the CAPP and the DESTHOST. CSP 310 has the ability to create or request to have created for it a certificate for any given DESTHOST, with the certificate chaining to a particular certificate that exists in computing device 200's trusted certificate store. For mode (3) crypto participant mode, this is possible by definition, because in this mode CSP 311 has access to part or all of the cryptographic information that is used in creating an encrypted network connection.

In an embodiment using CSP 311 in mode (3), crypto participant mode, CSP 311 may create a DESTHOST specific certificate entirely on computing device 200. In an embodiment, CSP 310 may request security server 320 to create a DESTHOST specific certificate and to transmit it to CSP 310 on computing device 200. In an embodiment, CSP 310 may request that security server 320 create and transmit an intermediate certificate and its associated private key. CSP 310 may then use that intermediate certificate to create a DESTHOST specific certificate on computing device 200. The latter embodiment is advantageous from the standpoints of security and efficiency: (1) in that a private key for an intermediate certificate used for signing is not stored persistently on computing device 200, rather it is only transiently stored during the operation of CSP 310; (2) in that the intermediate certificate may be specific to computing device 200, or to a date and time range, or a combination thereof, reducing any possible impact should the intermediate certificate and signing key be compromised; and (3) in that only one request from computing device 200 to security server 320 for an intermediate certificate used for signing is necessary for repeated operation of the CSP with several DESTHOSTs or network connections.

In an embodiment, a CSP 310 also partially or fully incorporates all the functionality of an Active MITM Detection (AMD) component as described above.

A. Prevention via Configuration of Trust i. Wi-Fi Security Methods

Wi-Fi networks use a variety of security methods. Some security methods are no longer considered secure; other methods are considered more secure than others. Example security methods include: open network (no security); Wired Equivalent Privacy (WEP); Wi-Fi Protected Access (WPA); WPA with Temporal Key Integrity Protocol (TKIP); WPA with TKIP/AES (Advanced Encryption Standard); WPA with AES; Wi-Fi Protected Access II (WPA2) with AES; WPA-Personal; WPA-Enterprise; and Wi-Fi Protected Setup (WPS). Additionally, there are many standard and vendor-specific variations of Extended Authentication Protocol (EAP) that are used in conjunction with establishing and authenticating Wi-Fi connections over 802.1x and that are also considered to be Wi-Fi security methods. Example variations include EAP-MDS, EAP-TLS (Transport Layer Security), EAP-TTLS (Tunneled Transport Layer Security), EAP-FAST (Flexible Authentication via Secure Tunneling), EAP for GSM (Global System for Mobile Communications) Subscriber Identity (EAP-SIM), EAP-AKA (EAP for UMTS (Universal Mobile Telecommunications System) Authentication and Key Agreement), LEAP (Lightweight Extensible Authentication Protocol), PEAP (Protected Extensible Authentication Protocol), and others.

a. Policy for Wi-Fi Security Method

Referring to FIG. 3, in an embodiment, policy 318 (from user settings or from administrator configured policies) may determine which Wi-Fi security methods are allowed to be used. In the embodiment, the CSP may apply the policy by determining the Wi-Fi security method being used and, when the Wi-Fi security method being used is allowed by the policy, allows the network connection to be made. When the Wi-Fi security method being used is not allowed by the policy, the CSP takes one or more of the following actions: displays a warning on computing device 200; notifies security server 320 (which in an embodiment displays a warning on an administrator console); presents an option for a user of computing device 200 to select whether to use the network connection or not; prevents the network connection from being made; and switches to a different physical network connection. Policy 318 may whitelist specific Wi-Fi security methods, or it may blacklist specific Wi-Fi security methods. In an embodiment, the policy may have a default action for Wi-Fi security methods that do not appear in either a whitelist or blacklist. The default action may be to allow the network connection, or to send a request for a decision to security server 320 that responds with an indication of which action to take, or may be any of the other actions listed above.

b. Policy for Wi-Fi Security Method with Qualifiers

In an embodiment, policy 318 for Wi-Fi security methods may include one or more of: qualifiers specifying a network name (ESSID or SSID), a DESTHOST name or other wild-carded specification of a destination host domain name, a list of CAPPs making the network connection, and a list of geographic areas. That is, in the embodiment, the policy for whitelist or blacklist or default action regarding Wi-Fi security methods is applicable: to the specified qualifiers, such as the name or identifier of a particular CAPP; for connections to a particular network name (ESSID or SSID); for making connections intended for a particular DESTHOST; for making network connections from computing device 200 in a particular geographic location; or for combinations of these.

For example, an enterprise may have a corporate Wi-Fi SSID called "CORP-EXAMPLE." It is possible that a MITM is advertising the same Wi-Fi SSID "CORP-EXAMPLE" from a MITM Wi-Fi AP as an enticement to the enterprise's employees to connect to it instead of to the legitimate "CORP-EXAMPLE" Wi-Fi network. The enterprise may well have protected its legitimate "CORP-EXAMPLE" Wi-Fi network with a particular Wi-Fi security method, but typically there is nothing on computing device 200 to prevent it from connecting to an impostor Wi-Fi network of the same name, and computing device 200 would not know that it has connected to an impostor. In fact, some computing devices will automatically connect to the impostor "CORP-EXAMPLE" Wi-Fi network because it has the same name as a previously-connected-to network. Computing device 200 will use the same basic authentication credentials as had been previously used in making a connection, but an impostor "CORP-EXAMPLE" MITM will likely accept whatever credentials are transmitted. As a result, a computing device of an enterprise's employee or contractor or other authorized user connects silently to an impostor "CORP-EXAMPLE" Wi-Fi network. An MITM can then attempt to compromise other credentials of computing device 200 or the user of computing device 200, or data transmitted on the network connection. In an embodiment, policy 318 for Wi-Fi security methods with a qualifier of SSID "CORP-EXAMPLE" may specify a whitelist of EAP-TLS with a default action to block or disallow a network connection if the required EAP-TLS security method is not used. This policy would prevent computing device 200 from connecting to any network with SSID "CORP-EXAMPLE" unless the EAP-TLS security method was being used. Some Wi-Fi security methods require the use of a shared key, that is, a key whose value is known to a Wi-Fi AP and is known to computing device 200 that connects to the Wi-Fi AP. In an embodiment, an AMD or a CSP in connecting to a Wi-Fi AP whose SSID is known by AMD 304 or the CSP to require the use of a shared key in its security method, intentionally sends the wrong shared key in its connection attempt. The authentic Wi-Fi AP with that SSID would reject the connection. But a MITM Wi-Fi AP that is impersonating that SSID would likely accept the invalid key because it wants computing device 200 to connect to it. In the embodiment, AMD 304 or CSP that sent an invalid shared key to the Wi-Fi AP responds to the Wi-Fi AP's acceptance of the invalid shared key as an indication that the Wi-Fi AP is a MITM. In response, AMD 304 or CSP may take one or more of the previously discussed actions in response to an MITM detection.

A policy qualifier of a list of geographic areas provides additional protection against impostor MITM Wi-Fi access points. Many computing devices will automatically attempt to connect to a Wi-Fi network having an SSID to which it has previously connected. Some computing devices broadcast all the SSIDs that they have ever connected to, seeking to connect to them if a Wi-Fi AP responds that it corresponds to the broadcast SSID. This can lead to faster connections than waiting to "hear" a broadcast from a Wi-Fi AP of its SSID. A MITM Wi-Fi AP, e.g., a Wi-Fi Pineapple, may respond to such broadcasted requests by impersonating any particular SSID. In an embodiment, a qualifier for a policy for Wi-Fi security methods may have a list of geographic areas in which it is acceptable to be connected to a given SSID. In an example, a policy could specify that SSID "CORP-EXAMPLE" can only be connected to in geographic regions for the company's office locations.

In an embodiment, a policy has an additional qualifier for a given SSID that indicates that computing device 200 should not broadcast that SSID. In an embodiment, a policy may be created for a "honeypot" SSID, which is an anomalous SSID for a particular environment, or any environment, or has simply not been seen by computing device 200 in a particular environment. The honeypot SSID is broadcast from computing device 200. If a Wi-Fi AP responds, indicating that it is that honeypot SSID, then AMD 304 or CSP on computing device 200 may conclude that the responding Wi-Fi AP is an MITM attempting to compromise network connections from computing device 200. In response to a Wi-Fi AP responding to the broadcast of a honeypot SSID, AMD 304 or CSP takes one or more of the following actions: displays a warning on computing device 200; notifies security server 320 (which in an embodiment displays a warning on an administrator console); prevents the network connection from being made; and switches to a different physical network connection. In an embodiment, a policy with a honeypot SSID qualifier specifies a list of candidate SSIDs for computing device 200 to use, or defines a procedure for generating random honeypot SSIDs, or a combination thereof. This embodiment is advantageous for preventing a knowledgeable attacker from avoiding responses to known honeypot SSIDs. In an embodiment, a procedure for generating random honeypot SSIDs may include a procedure for generating honeypot SSIDs that are similar to actual SSIDs that computing device 200 has connected to in the past or that computing device 200 observes being broadcast to it by Wi-Fi APs in the environment in which it is currently located.

c. Policy for Wi-Fi Security Method with Expected MAC or BSSID

In an embodiment, policy 318 for Wi-Fi security methods may specify one or more of the MAC addresses or BSSIDs of the Wi-Fi access point that should be expected when a connection is made to a given Wi-Fi network with a particular name (SSID or ESSID). If AMD 304 upon making a network connection to a Wi-Fi network with a particular name sees that the MAC address or BSSID of the Wi-Fi access point is contained by policy 318 for that network name, then the connection is allowed to be used. If AMD 304 upon making a network connection to a Wi-Fi network with a particular name sees that the MAC address or BSSID of the Wi-Fi access point is not contained by policy 318 for that network name, then AMD 304 takes one or more of the following actions: it warns the user of computing device 200, it sends a notice to security server 320 (which in an embodiment causes a warning to appear on an administrator console), it breaks the network connection, and it presents an option to a user of computing device 200 to choose to continue to use the network connection. In an embodiment, AMD 304 may display an indication on computing device 200 that the network has been deemed secure by the policy.

d. Policy for Wi-Fi Security Method with Active Verification Probing

In an embodiment, policy 318 for Wi-Fi security methods may divine for a given network name (ESSID or SSID), that a particular Wi-Fi security method is used. But this provides only partial protection against an impostor MITM. In an embodiment, policy 318 may specify that one or more active verification probes be performed. For example, on the legitimate "CORP-EXAMPLE" network there are certain internal-only network resources that are visible (e.g., via DNS) or reachable (e.g., via communications on the "CORP-EXAMPLE" network) only visible or reachable on the CORP-EXAMPLE network. An active verification probe is a connection made from an AMD or a CSP to such an internal-only network resource. Policy 318 specifies the type and identifier for the internal-only network resource, together with what the expected response from a probe should be. For example, a probe type could be a DNS TXT (Text Record) query. The expected result in the policy would be the response value expected from the query. Or the probe type could be a pinned TLS request to an internal-only network resource. The expected response would then include (in the TLS handshake protocol between the CSP and the internal-only network resource) the certificate chain (or an SPKI hash thereof) of that internal-only network resource, where the certificate chain includes a unique self-signed certificate created by the enterprise or other such certificate. Such a response could not be impersonated by a MITM that does not have access to the private key of the enterprise self-signed certificate.

A policy that specifies one or more active verification probes to be performed will prevent an impostor MITM Wi-Fi AP from fooling a computing device or user into unknowingly connecting to it. In an embodiment, if the active verification probe succeeds (the results obtained match the defined expected results), then the network connection is allowed to continue. In an embodiment, the CSP or AMD may display an indication that the connection has been verified on the display of computing device 200. If the active verification probe does not succeed, the CSP or AMD may warn the user, or sends a notice to security server 320 (which in an embodiment causes a warning to appear on an administrator console), or breaks the network connection, or several of these actions. In an embodiment, upon the failure of an active verification probe (which could happen because computing device 200 is connected to an impostor MITM Wi-Fi AP, or because a particular active verification probe endpoint server has failed or gone down or is otherwise unreachable due to some transient network conditions), AMD 304 or CSP attempts a second active verification probe, using information from policy 318. In an embodiment, if the second active verification probe succeeds (results obtained match with the defined expected results), then the network connection is allowed to continue. In an embodiment, the CSP or AMD may display an indication that the connection has been verified on the display of computing device 200. If the second active verification probe does not succeed, the CSP or AMD may warn the user, or send a notice to security server 320 (which in an embodiment causes a warning to appear on an administrator console), or break the network connection, or attempt yet another active verification probe, or retry a previously attempted active verification probe, or several of these actions.

ii. Commonly Used DESTHOST Certificates and CA Policy

There may be tens to hundreds of Trusted Root Certificate Authorities (CAs) in the trusted certificate store of a typical computing device. For example, a recent version of Android shipped with 147 different trusted root certificate authorities listed. Web browser applications also have their own list of trusted root certificate authorities. There is no restriction on which trusted root certificate authority may be used to sign a certificate for any particular destination host (DESTHOST). If a Root CA becomes compromised (as has happened in the past), that compromised Root CA could be used to sign certificates for any given DESTHOST, allowing an attacker with access to the compromised Root CA to MITM any connection. But typically an organization or individual offering TLS connections from a destination host has arranged with only one or a small number of Root CAs to issue certificates for that destination host. It would be desirable to be able to determine, in a CSP, whether the certificate used for a destination host is one that is usually used for that destination host.

There are existing solutions for this problem just for browsers via a browser extension, e.g., The SSL Observatory from the Electronic Frontier Foundation (EFF). The SSL Observatory has data it has obtained from downloading publicly-visible SSL/TLS certificates and reports when an observed certificate corresponds to one that has been used in the past for a particular DESTHOST.

In an embodiment, a CSP (operating in any of modes (1), (2), or (3)) observes the server certificate chain information that is part of a TLS handshake protocol for a DESTHOST. The CSP may determine, according to a policy 318 having a common use certificate checking qualifier, whether the certificate chain used matches one of the certificates used in an historical store of certificate information by DESTHOST, or matches certificate information for DESTHOST obtained by the CSP requesting current certificate information for DESTHOST from security server 320. Security server 320 determines the current certificate information for DESTHOST by performing at least the first part of a TLS handshake protocol with DESTHOST to obtain the server certificate information from the DESTHOST. In an embodiment, security server 320 may use one or more proxy servers distributed geographically or on different network providers to retrieve DESTHOST certificate information by the same means (using the TLS handshake protocol). In an embodiment, security server 320 may cache DESTHOST certificate information for responding to a requesting CSP. In an embodiment, the CSP may cache DESTHOST certificate information. If the certificate chain information matches, the CSP allows the network connection to continue. In an embodiment, the CSP may display an indication that the connection has been verified on the display of computing device 200. If the certificate does not succeed, the CSP warns the user, or sends a notice to security server 320 (which in an embodiment causes a warning to appear on an administrator console), or breaks the network connection, or presents on computing device 200 an option for a user to choose whether to continue the network connection or not, or several of these actions. In an embodiment, a policy having a historical certificate checking qualifier may be specified to apply to all DESTHOSTs, or to a specific list of DESTHOSTs.

In an embodiment, the historical information showing which certificate information has been used in the past for connections to DESTHOST may be transmitted by a CSP to be stored on security server 320 and reside there waiting to be requested by another CSP. In an embodiment, part or all of the historical information may be cached on computing device 200, so that another request for it need not be sent to security server 320.

In an embodiment, policy 318 may have a root level CA qualifier. The root level CA qualifier may contain a whitelist of CAs that are to be considered valid by a CSP on a computing device; a blacklist of CAs that may be in a computing device's trusted certificate store but which are not to be trusted by the CSP; and a default action for a CA not on either a whitelist or a blacklist. This embodiment is advantageous because it can be difficult on some computing devices to remove untrusted root level CAs from computing device 200's trusted certificate store. Thus, having a policy mechanism that can be quickly modified (e.g., at security server 320) and then pushed to or fetched by computing device 200 can allow more rapid responses to changes in trust levels for root CAs.

In an embodiment, a policy 318 with a root level CA qualifier may be combined with other qualifiers (e.g., a list of applicable DES THOSTs, or one of the names in a DESTHOST name—the "corp" in corp.example.com) to provide an additional level of protection. For example, an enterprise may specify in a policy a root level CA qualifier the particular root level CA that the enterprise uses for signing the DESTHOST certificates for its enterprise servers. Such a policy would also specify a list of the enterprise DESTHOSTs, or as in other DESTHOST qualifiers, a wildcarded specification, such as "*.enterpriseexample.com". Such a policy would prevent any root level CA other than the ones specified from being used to sign DESTHOST certificates for the enterprise's DESTHOSTs. In an embodiment, a policy may additionally specify pinning information for certificates for a particular DESTHOST, where pinning information is information that can be used to verify that a particular certificate, or a public key contained in a certificate, is present for communications to that particular DESTHOST. Pinning information may be collected by CSPs on computing devices: by observing actual certificates in use for a DESTHOST; or by observing HPKP directives in HTTP headers sent from a DESTHOST (HPKP is the Request for Comments (RFC) 7469, Public Key Pinning Extension for HTTP). Pinning info may also be determined by security server 320 using pinning information received from other CSPs, or by security server 320 making connections to a DESTHOST directly, or through one or more proxy servers distributed geographically, and recording the responses.

In an embodiment, a policy 318 with a root level CA qualifier may be combined with other qualifiers, such as a list of geographic regions for which a root level CA qualifier can be considered as a valid signer of DESTHOST certificates. For example, a version of Android includes in its "Trusted Credentials" (computing device 200's trusted certificate store) a root level CA of "China Internet Network Information Center." A user of computing device 200 or an administrator of policy for computing device 200 may wish to allow that root level CA to sign DESTHOST certificates for destination hosts in the ".cn" top level domain, or for destination hosts that are determined by a well-known IP geolocation process to reside in China, however, out of an abundance of caution, the user may specify that that root level CA is not to be used to sign DESTHOST certificates for any other destination host. In an embodiment, policy 318 with a root level CA qualifier and a geographic coverage qualifier may be used by a CSP to determine whether a DESTHOST certificate or certificate chain observed in making a network connection to a destination host is allowed by the policy or not. If the policy does not allow for the combination of root level CA and the DESTHOST certificate, the CSP takes one or more actions, such as: displaying a warning on computing device 200, providing an option to disconnect the network connection, blocking or disallowing the network connection, providing a user of computing device 200 an option to continue using the network connection, switching to a different network connection, and sending anomaly information to security server 320.

In any of the above embodiments for policy based detection of a certificate being used where the certificate does not match a commonly used certificate or a certificate allowed by policy, such a detection is considered another form of MITM detection, and one or more of the previously responses to MITM detection are taken.

B. Prevention via Connections

This specification now turns to connection-related methods for responding to MITM detection by making connections to mitigate the effect of an MITM, and methods for avoiding MITMs completely.

i. Basic Connection/Reconnection Process

In an embodiment, a CSP receiving a request from a CAPP to make a network connection to a DESTHOST may avoid a MITM detected by any of the previously described means as being present on the network connection using a connection/reconnection process. In the process, the CSP sets up a secure tunnel through a remote server (e.g., security server 320) to the DESTHOST using certificate pinning to set up the secure tunnel through the remote server. In the embodiment, the secure tunnel may use the same physical network as the one on which the MITM was detected, or may use a different logical or physical network. For example, if the MITM was detected while computing device 200 was connected to the Wi-Fi network "COFFEESHOP-FREE-WI-FI," then the secure tunnel could be set up using the same Wi-Fi network, or could be set up using a different Wi-Fi network, e.g., "CITY-FREE-WI-FI," or could be set up using computing device 200's cellular data network, or any other physical network available to computing device 200. The CAPP continues to use the connection set up by the CSP through the secure tunnel. This embodiment is appropriate for use with any networking protocol, but has the disadvantage that additional networking infrastructure (the ongoing use of security server 320 to tunnel the connection between the CSP and the DESTHOST) is required, potentially adding to the cost or performance of this embodiment.

ii. Two-Part Connection/Reconnection Process

In an embodiment, a CSP receiving a request from a CAPP to make a network connection to a DESTHOST may avoid a MITM detected by any of the previously described means as being present on the network connection by using a two-part process. The first part of the process is the same as the basic connection/reconnection process described above. In the first part of the process the CSP sets up a secure tunnel through a remote server (e.g., security server 320) to the DESTHOST, using certificate pinning to set up the secure tunnel to the remote server. The CSP them performs a TLS handshake protocol with the DESTHOST over that secure tunnel, records session information (such as the negotiated session key and the session ID or session resumption ticket (see Request For Comments (RFC) 5077 "Transport Layer Security (TLS) Session Resumption without Server-Side State")). The CSP then breaks the network connection between the CSP and the DESTHOST that was tunneled through security server 320. In this first part of the reconnection process the CSP is performing the role of "client" in the TLS handshake protocol with the DESTHOST. But the CSP is also performing the part of "server" in the communication between the CAPP and the CSP. The CSP is essentially performing an SSL proxy or MITM operation in order to ensure greater overall security for communications from computing device 200. Just as in the basic reconnection process described above, the secure tunnel established through the remote server, e.g., security server 320, is established using the same physical network connection on which the MITM had been detected, or uses a new physical network connection of the same or different type (type being Wi-Fi or cellular data connection or BLUETOOTH or other type of physical network connection).

In the second part of the process the CSP makes a direct connection to the DESTHOST and uses the abbreviated TLS Resume Handshake Protocol with the DESTHOST. Because the session key has been established already via a tunnel to which a MITM did not have access, the MITM does not have knowledge of the previously negotiated TLS session key, and the MITM cannot modify the TLS Handshake protocol, because its contents are protected against alteration with a Message Authentication Code (MAC) (as described in the Internet Engineering Task Force (IETF) Request For Comments (RFC) 5246 "The Transport Layer Security (TLS) Protocol Version 1.2"). A MITM can, of course, deny access by completely blocking network communications to the DESTHOST, but, if it allows network communications to proceed at all, it cannot read or modify communications between the CSP and the DESTHOST without being detected.

The two-part reconnection process is advantageous over the basic reconnection process because it does not require most of the communication to occur through the secure tunnel through security server 320. Only the initial TLS handshake protocol (a few round trip messages) takes place through the secure tunnel. The rest of the communication is direct from the CSP on computing device 200. The two-part reconnection process is appropriate for cases when the CAPP is requesting an HTTPS or other TLS-enabled connection to a DESTHOST. Whether and HTTPS or a TLS connection is being requested may be known initially by the requested port (e.g., port 443 is conventionally used for HTTPS while port 80 is used for HTTP, port 995 is conventionally used to make a secure POPS connection, while port 110 is used for non-encrypted POPS connections, and similarly for various other protocols), or by a known history of network connection behavior for a given CAPP. In an embodiment, security server 320 has stored information about which destination hosts a given CAPP connects to, and characteristics of how the CAPP connects, including which port(s), which protocol(s), and whether communications are encrypted or not. CSPs on computing devices can send such information about a CAPP as observed on computing devices to security server 320 for storage. Server-side analysis of CAPPs can also be used to observe or determine that same information. In an embodiment, a CSP requests the history of such stored information for a CAPP from security server 320, and based on that information determines whether an encrypted communication will be requested. The CSP then chooses to use the basic reconnection process (when a connection is expected to not be requested to be encrypted) or the two-step reconnection process (when a connection is expected to be requested to be encrypted). In an embodiment, the history information for a given CAPP may be cached on computing device 200 and this local copy of history information may be used to make a determination whether the connection requested is expected to be encrypted or not.

In an embodiment, a CSP may detect the presence of a MITM on a network connection. The CSP detects the MITM using the methods of an Active MITM Detection component, or by any of the previously discussed methods, such as: the failure of an active verification probe; the presence of a certificate from a DESTHOST that does not match historical information for commonly used certificates for the DESTHOST as represented in a policy; by observing a MAC address or BSSID of a Wi-Fi AP that is not in a policy for a network of that particular name (SSID or ESSID); or by other means. When the CSP detects the MITM the CSP either: performs the two-part reconnection process described above to make a secured connection to the desired DESTHOST (when the connection is expected by the CSP to be encrypted); or performs the basic reconnection process described above to make a secured connection to the desired DESTHOST (when the connection is expected by the CSP to not be encrypted). In an embodiment, if the actual type of connection requested by the CAPP turns out to be different from the type of connection expected for the CAPP, the CSP switches between the two reconnection methods to the one appropriate for the actual type of connection requested by the CAPP. For example, if the CSP expects, based on port information in the request from the CAPP or historical information regarding the network behavior of the CAPP, that the CAPP will be requesting an encrypted communication, the CSP would commence with the two-part reconnection process that is appropriate for encrypted communications. But once the CSP observes that the CAPP is actually requesting a non-encrypted connection, the CSP switches over to use the basic reconnection method that is appropriate for a non-encrypted connection request from the CAPP. In an embodiment, the switch over process involves breaking an existing connection, or involves reusing the secure tunnel that had been established from the CSP to the secure server.

In an embodiment, a CSP, according to a policy 318, initially may use either the basic connection process or the two-step connection process when making connections. That is, connections from a given CAPP or to a given DESTHOST initially use the basic or the two-step process based on a policy regardless of whether or not there has been a detection of a MITM. This may be a blanket policy, or may be determined based on other risk levels determined by security server 320 for computing device 200. In an embodiment, other risk levels may include information regarding the geographic location of the device, the assessed security state of the device, the value of information that is stored on the device, other criteria, or combinations thereof.

In an embodiment, for connections made by certain CAPPs or to certain DESTHOSTs, the data that is transmitted is not sensitive. For such connections and even if the connection is not encrypted, a CSP may use a policy that specifies that, if a MITM is detected, the connection should be allowed to continue as a direct connection from the CSP to the DESTHOST. For example, a music streaming application that uses unencrypted communications has been determined by an enterprise administrator to involve no data that is sensitive from an enterprise standpoint, therefore the overhead of the basic connection process should not be used.

In an embodiment, a connection from a certain CAPP or to a certain DESTHOST may contain mostly non-sensitive data, but there may be some data sent, such as login credentials or a cookie containing sensitive credential related information, which should be protected. In this embodiment, a policy for a certain CAPP or to a certain DESTHOST specifies that the CSP is to detect when the CAPP is attempting to transmit sensitive data (usually but not exclusively credential related data) through the CSP. Upon such detection, if the current connection is not encrypted, the CSP is to switch to the basic reconnection process to continue the connection from the CAPP through the CSP to the DESTHOST. By this switch the sensitive data transmission is protected even if there is a MITM on the original network connection. In an embodiment, upon the CSP determining that the transmission of sensitive data has concluded (e.g., after an initial login transaction), the CSP may switch back to the direct, unencrypted connection from the CAPP through the CSP to the DESTHOST. This embodiment is advantageous in that it protects the transmission of sensitive data, while not incurring any additional overhead for the transmission of non-sensitive data. In an embodiment, the CSP may detect the attempt to transmit sensitive data by inspecting the content of the data being requested by the CAPP to be transmitted, looking, for example, for login or password related forms or fields.

C. Password Firewall

It is an objective of MITM detection and prevention methods to prevent a MITM from compromising sensitive data, including credentials and passwords. A user may employ the same password on multiple sites. This can increase the risk to a user because a breach on one site can reveal the user's password on other sites. An enterprise may wish to enforce a policy that prevents a user from re-using any password that is used for an enterprise site or service as a password for any non-enterprise site or service. It would be desirable to be able to prevent such password re-use, or the inadvertent typing of a password into a non-password field, in order to reduce the impact of an undetected MITM attack or a data breach of credential data associated with a DESTHOST.

In an embodiment, a CSP may implement a "password firewall." A password firewall is able to remember or store some form of every password entered by a user so that it can detect that the password is being entered "somewhere else." In an embodiment, the "some form of every password" is a hash of the password that can be used for comparison. The "somewhere else" is that the password is being used as a password for some other site, or that the password has inadvertently been entered in the wrong field, which will be transmitted in the clear. The password firewall detects this situation and in an embodiment warns the user or prevents the transmission, or both.

The form of a password may be stored at computing device 200 or at security server 320, or some combination thereof. The form of the password may be the password itself, or a hash or encryption of the password. In an embodiment, a hash may be salted with a salt stored at computing device 200 or with a salt obtained by computing device 200 from security server 320. The decryption key for an encryption of the password may be stored on computing device 200 or may be obtained by computing device 200 from security server 320.

The password firewall may be implemented in CSP 310, or in any sort of network shim, or in an input method or installable keyboard (e.g., for Android, but not for iOS, which uses the native input mechanism for passwords), or via other system hook, such as the accessibility APIs for an operating system that allow access to or modification of inputs from a user of computing device 200.

In an embodiment, a variation of a password firewall may look for "schemes" of passwords that are reused across sites. For example, a user might employ a password scheme for ease in memorization that uses a text string and something unique about the DESTHOST, e.g., password=CorrectHorseBatteryStaple4!Amazon for DESTHOST=amazon.com and password=CorrectHorseBatteryStaple4!Apple for DESTHOST=apple.com, and so on. This sort of scheme is susceptible to the same problem, namely, a breach that reveals one such password essentially gives away all other passwords for other sites that used the scheme. In this variation, the detection mechanism examines the original password and classifies parts of it as domain-independent and parts of it as domain-dependent. In an embodiment, a password firewall prevention rule involves not the hash of the entire password, but a notation that the hash is for the first 23 characters of the password ("CorrectHorseBatteryStaple4!").

In an embodiment, a policy for a password firewall protects one or more passwords for a specific list of CAPPs, or cloud-based applications, or DESTHOSTs, e.g., for those used by an enterprise. In the embodiment, the policy allows for reuse of passwords within the specific list, e.g., to support an enterprise single sign on or cloud-based identity provider, but disallows the use of any of the passwords for the specific list in any other CAPP, or cloud-based application, or DESTHOST. Such a policy is advantageous for an enterprise to minimize the impact to an enterprise of a data breach at any non-enterprise DESTHOST.

D. Prevention of App or Instant App Request or Download or Execution

Recent versions of some operating systems on computing devices allow the instant download and execution of parts of a client application, e.g., Instant Apps on Android, or code on iOS devices delivered using Apple App Thinning, or the like. An enterprise administrator may by policy specify that such application fragments (all or specific ones) not be allowed to execute on computing device 200. In an embodiment, a CSP with a policy covering, e.g., application or instant application requests or downloads or executions, detects an outbound request to download an application or application fragment and based on the policy disallows the request by blocking the transmission of the outbound request. In an embodiment, the policy may specify that the CSP on computing device 200 is to send a message to security server 320 for approval of the request to download. Security server 320 is to respond with an approval or a denial of the request, and the CSP act accordingly, by allowing the request to be transmitted, or blocking it.

In an embodiment, the same type of policy is applied to the receipt of a downloadable application or application fragment, with the same result of approval and allowance, or blocking of receipt. In an embodiment, the same type of policy is applied to the execution of a downloaded application or application fragment, with the similar result of approval to execute, or blocking the execution of the application or application fragment.

E. Detection or Prevention for Devices Connected Through Device with the AMD

A user may carry many devices (wearables, implantables, ingestibles, etc.). Such devices may not have the computational power or battery power to run an AMD or CSP. But often such devices perform their communication via another computing device of the user, such as a fitness band or watch communicating to a DESTHOST via a BLUETOOTH connection to a smartphone, which in turn communicates with the DESTHOST. In an embodiment, a first computing device is protected from a MITM by communicating through a second computing device, upon which is running an AMD or a CSP, with AMD 304 or CSP performing any of the above described methods for MITM detection or response.

In an Internet of Things (IoT) scenario, there are one or more "things" (computing devices or sensors or actuators) connected to an IoT "hub" and indirectly connected, through the IoT hub, to a particular DESTHOST. In an embodiment, an IoT "thing" or device does not have the computational power or battery power to run an AMD or CSP. But often such devices perform their communication via an IoT hub (which could be a device in the home or the workplace or could be a vehicle, e.g., an automobile). For example, a smartphone may communicate with a DESTHOST via a BLUETOOTH connection to the IoT hub, which in turn communicates via a cellular data connection (e.g., LTE) with the DESTHOST. In an embodiment, a first computing device is protected from a MITM by communicating through a second computing device, where the second computing device is an IoT hub upon which is running an AMD or a CSP that may perform any of the above described methods for MITM detection or response.

In an embodiment, an AMD or CSP may detect a MITM and reports it to security server 320 with sufficient additional information (such as an IP address or a MAC address, or other information to identify the detected MITM. The report may be displayed on an administrator console. The administrator console receives a command to initiate a denial of service attack on the offending MITM, e.g., an offending Wi-Fi AP. The administrator console sends to one or more computing devices the command. Computing device 200, receiving such a command, and determining that it is in the general location of the offending MITM Wi-Fi AP, performs the command by repeatedly attempting to connect and disconnect to that MITM Wi-Fi AP. As soon as computing device 200s connect they initiate a dummy data upload and then disconnect. The purpose of this is to deny other innocent computing devices from being able to connect to the rogue MITM Wi-Fi AP.

An administrator of an enterprise may wish to prevent computing devices that have a capability of offering Wi-Fi tethering hotspots from doing so by using any of the SSIDs that the enterprise uses. This is to prevent inadvertent or willful deception of potential users seeking to connect to legitimate enterprise SSIDs. In an embodiment, an administrator may create a blacklist of the enterprise SSIDs that the administrator wishes to protect. The blacklist is transmitted to one or more computing devices, e.g., computing devices that are supported by the enterprise. Computing device 200 receives the blacklist, and does one or more of the following actions: disables tethering if a user of computing device 200 attempts to create a tethering hotspot using any of the blacklisted SSID names; prevents the blacklisted SSID names from being entered into or programmed into the SSID name field by a user; reports any attempt to use one of the blacklisted SSID names as a tethering SSID to the enterprise administrator or an enterprise security server (e.g., security server 320); and informs a user of computing device 200 via computing device 200's user interface that the enterprise SSID is blacklisted for tethering purposes.

F. Detection and Prevention via a Policy for HSTS Hosts

Websites may be made to operate under a policy called HTTP Strict Transport Security (HSTS). A website operating under this policy declares itself accessible only by secure connections, or that users are able to direct their user agent to interact with the website only over a secure connection, or both. The website may declare this policy using an HSTS response header field and also by other means, such as user agent configuration.

According to IETF RFC 6797, HSTS uses a server-sent header:
Strict-Transport-Security="Strict-Transport-Security" ":" [directive]*(";" [directive])
directive=directive-name ["="directive-value]
directive-name=token
directive-value=token|quoted-string
where:
token=<token, defined in [RFC2616], Section 2.2>
quoted-string=<quoted-string, defined in [RFC2616], Section 2.2>

Still according to IETF RFC 6797, a required "max-age" directive specifies the number of seconds, after the reception of the STS header field, during which the user agent (UA) is to regard the host from whom the message was received as a Known HSTS Host. An optional "includeSubDomains" directive is a valueless directive that, if present (i.e., it is "asserted"), signals to the UA that the HSTS Policy is to be applied to the HSTS Host as well as any subdomains of the host's domain name. An example of a server-sent HSTS header may be: Strict-Transport-Security: max-age=31536000; includeSubDomains; preload.

Some browsers have preloaded lists of hosts that have HSTS enabled. This is to avoid the problem of the first interaction between a user agent and a host being altered by a MITM that removes (or "strips") the HSTS header.

In an embodiment, policy 318 for CSP 310 may be for HSTS hosts set, e.g., by an administrator of an enterprise. Policy 318 may include a list of hosts (e.g., hosts of the enterprise or hosts used by the enterprise) and may specify that HSTS protocol should be used for connections to these hosts. CSP 310 may have requested policy 318 for HSTS hosts from security server 320, or CSP 310 may have received policy 318 for HSTS hosts pushed from a security sever. Because a CSP is a transparent proxy and, therefore, is in the middle of all network connections, CSP 310 may provide the benefits of HSTS even on the first connection to a host.

In the embodiment, CSP 310 also observes HSTS headers and acts as a conformant user agent. Also, upon observing HSTS directives for a host, CSP 310 sends that information to security server 320 for storage. In the embodiment, CSP 310 upon seeing a connection made to Host X, where there is no HSTS policy, nor a remembered HSTS directive for Host X, may inquire of security server 320 whether security server 320 is aware of HSTS directives being sent from Host X. In response, security server 320 tells CSP 310 whether there is a history of HSTS protection for Host X. If there is a history of HSTS protection, then CSP 310 applies HSTS behavior for the connection to Host X. Note that CSP 310 applies the HSTS policy regardless of whether there is an HSTS directive or header sent from Host X. In applying an enterprise HSTS policy for Host X, CSP 310 will convert any outbound HTTP connection request for Host X into an HTTPS request. If Host X does not accept the HTTPS request and turns it into an HTTP request, CSP 310 drops the connection pursuant to the enterprise HSTS policy.

G. Detection of Homoglyph Domains for a Protected List

Unicode contains a large number of characters. Many Unicode characters look like the characters of one or more alphabets, but are represented by binary codes that are different from the alphabetic characters they resemble. Browsers and other programs can display the Unicode characters, and to a human user it may be difficult or impossible to distinguish between a character of an alphabet and a similar-looking "imposter." Thus, an attacker may register a domain using Unicode characters that, to a human user, will appear confusingly-similar to a different domain. Such confusion may make programs or systems vulnerable to security attacks.

In an embodiment, a policy may specify a list of domain names that are to be "protected" by the CSP. The CSP, when it is attempting to make a connection to a host X, examines the host X's domain name and determines whether the name could be visually confusable with a domain on the list of domain names. Unicode, itself, defines a set of confusable characters. If the CSP determines that the domain name for host X is visually confusable with a domain on the list of domain names, then the CSP performs one or more actions, such as: warning the user of the device, dropping the connection to host X, making a connection to a host whose domain name is on the list, not the host X (i.e., connecting to the "real" or "protected" host, not the visual impostor), sending a notification or alert to security server 320 or administrator or administrator console, and sending a notification to an administrator of the protected domain on the list that a visual confusion attack was attempted. In an embodiment, the domain names to which the device has connected during a configurable period of history may be added to the list of domain names to be protected.

In an embodiment, the CSP may determine whether the domain is composed of a suspicious mixture of characters. Characters in Unicode are associated with particular "scripts" such as Latin or Cyrillic, etc. When a domain name contains characters from different scripts, it is potentially suspicious. In the embodiment, a policy may be used by the CSP to decide which action to take when a suspicious mixture of characters in a domain is detected. For example, the policy may call for one or more actions from: warning the user of the device, dropping the connection to host X, sending a notification or alert to security server 320 or administrator, or administrator console.

H. MITM Attack Notification to Administrator via SMS

When an MITM attack is occurring against a device, because the MITM is in the middle of the network connection the attacker may be able to prevent the device from notifying an administrator or administrative server that the attack has occurred. In an embodiment, a device that detects a MITM on one network communication mechanism may notify an administrator or an administrative server of the attack via a different network communication mechanism. For example, if the MITM was detected on a Wi-Fi connection, the device may send a notification of the MITM attack via SMS, or SIP, or via the device's cellular network connection.

I. Use of Server Name Indication (SNI) on Test Probe Connections to Trigger Targeted MITM Attacks In an embodiment, MITM attack detection may be performed by probing a particular host for which some expected return information is known prior to the request, or may be obtained after the request. This MITM attack detection protects against the use of an exploitable feature of the TLS protocol. The TLS protocol, at the beginning of the TLS handshake process, includes an extension in which a client includes the name of the host to which the client is attempting to connect. A MITM attacker that is selectively targeting traffic for particular hosts or domains may inspect the TLS Server Name Indication (SNI) information to determine whether to launch an MITM attack against that traffic or not.

In an embodiment, a MITM probe to a probe server may be sent with particular SNI information that might entice a MITM attacker to launch an MITM attack against the MITM probe. Such an MITM attack would be detected. Note that the SNI information used in the MITM probe is not the domain name of the probe server, but a different domain name that could be of interest to a MITM attacker. In an embodiment, the SNI information may be from a list of domains on the mobile communications device, or obtained from a server for use as SNI information.

An embodiment is directed to a method for omitting to report that a connection is compromised, the method comprising: determining, by a security component on a computing device, that captive portal authentication is enabled for the computing device for a connection; requesting, by the security component, a response from a first server over the connection; in response to the requesting, receiving, by the security component, an indication that the connection is compromised; and omitting to report, by the security component, that the connection is compromised based on the determination that captive portal authentication is enabled for the computing device for the connection, wherein but for the determination that captive portal authentication is enabled, the security component would have reported that the connection is compromised to at least one of: a user, an administrator, and a security server. In the embodiment, the indication that the connection is compromised may include: (i) not receiving, by the security component, a response from the first server; or (ii) when a response from the first server is received, comparing, by the security component, a received component of the response from the first server to an expected component, the comparing resulting in a second determination that the received component of the response is different from the expected component. The embodiment may further comprise, before the requesting, by the security component, a response from a first server over the connection: detecting, by the security component, a change in the connection, wherein the detecting a change in the connection prompts the security component to request the response from the first server over the connection. The change in the connection may include one or more of: a making of the connection, a change to a protocol of the connection, and a change to a parameter of the connection. In the embodiment, the indication that the connection is compromised may include one or more of: (i) that services provided by the connection are limited; (ii) that the requesting, by the security component, a response from a known server over the connection was redirected; (iii) that the security component failed to make a pinned network connection to the first server or a second server; (iv) that a self-signed or a host-mismatched certificate was presented to the security component; and (v) that the connection intercepts TLS communications. The embodiment may further comprise: reporting, by the security component, the indication that the connection is compromised to one or more of: an administrator; an end user; and a server-side event store. The reporting may further comprise reporting, by the security component, that the indication that the connection is compromised is false or is potentially false. In the embodiment, the requesting a response from a first server over the connection may be repeated by the security component with an arbitrary interval between the repeated requests.

An embodiment is directed to a method for detecting the compromise of a first connection, the method comprises: (i) receiving, by a client-side proxy on a computing device from an application on the computing device, a communication before the communication is sent to a recipient designated by the application; (ii) inspecting, by the client-side proxy, the communication before the communication is sent to the recipient; (iii) based on the inspection, determining, by the client-side proxy before the communication is sent to the recipient, that the communication is to be sent using the first connection; and (iv) performing an action, by the client-side proxy before the communication is sent to the recipient, the action resulting in an indication that the first connection is compromised. In the embodiment, the performing an action, by the client-side proxy before the communication is sent to the recipient, the action resulting in the indication that the first connection is compromised may include the client-side proxy performing a probe of the first connection. In the embodiment, the probe of the first connection may result in the client-side proxy receiving a second communication, wherein the client-side proxy inspects the second communication, and wherein the indication that the first connection is compromised includes the client-side proxy detecting at least one of: (i) content in the second communication that does not match expected content; (ii) a first certificate in the second communication that does not match an expected certificate; (iii) a second certificate in the second communication that is included on a list of revoked certificates; (iv) an address in the second communication that does not match an expected address; (v) an identifier in the second communication that does not match an expected identifier; and (vi) secure socket layer (SSL) information or transport layer security (TLS) information that does not match expected SSL or TLS information. In the embodiment, the expected certificate, the expected address, or the expected identifier may be represented in a policy, the policy being specified by an administrator or a user. In the embodiment, performing the action, by the client-side proxy before the communication is sent to the recipient, the action resulting in the indication that the first connection is compromised may include the client-side proxy comparing data associated with the first connection to data associated with known compromised connections. The embodiment may further comprise, based on the indication that the first connection is compromised: modifying, by the client-side proxy before the communication is routed to the recipient, the communication by one or more of: (i) deleting, by the client-side proxy, data from the communication; (ii) deleting, by the client-side proxy, content from the communication; (iii) modifying, by the client-side proxy, a destination of the communication; and (iv) routing, by the client-side proxy, the communication to use a second connection. The embodiment may further comprise, based on the indication that the first connection is compromised: (i) modifying or breaking, by the client-side proxy before the communication is routed to the recipient, the first connection; (ii) implementing, by the client-side proxy before the communication is routed to the recipient, destination filtering, the destination filtering determining whether a sender of the communication may send communications to the recipient; and (iii) implementing, by the client-side proxy before the communication is routed to the recipient, content filtering, the content filtering determining one or both of: whether the communication is allowed to be sent by the computing device, or whether the communication includes potentially harmful content. In the embodiment, the client-side proxy may have access to a first certificate in a certificate store on the computing device and the communication may be an encrypted communication, and the embodiment may further comprise: (i) creating, by the client-side proxy using the first certificate before the communication is routed to the recipient, a second certificate related to the communication; and (ii) using, by the client-side proxy before the communication is routed to the recipient, the second certificate to decrypt the encrypted communication. In the embodiment, the client-side proxy may be a component of a client application on the computing device, the communication may be an encrypted communication, the client-side proxy component may have access to information involved in the creation of the encrypted communication, and the embodiment may further comprise: (i) creating, by the client-side proxy using the information involved in the creation of the encrypted communication before the communication is routed to the recipient, a certificate related to the communication; and (ii) using, by the client-side proxy before the communication is routed to the designated recipient, the created certificate to decrypt the encrypted communication.

An embodiment is directed to a method for preventing the use of a first connection, the method comprising: (i) inspecting, by a client-side proxy on a computing device, a communication from an application on the computing device to a destination, the communication configured to use the first connection to communicate with the destination, the inspecting of the communication being completed before the first connection is used; (ii) creating, by the client-side proxy before the first connection is used, a second connection, the client-side proxy creating the second connection through a server to the destination; and (iii) modifying, by the client-side proxy, the communication to send the communication using the second connection instead of using the first connection. The embodiment may further comprise: determining, by the client-side proxy from the inspecting before the first connection is used, that the first connection is to be used; detecting, by the client-side proxy, that the first connection is compromised before the creating, by the client-side proxy, the second connection to the destination; and modifying, by the client-side proxy after the communication, a second communication from the application so that the modified second communication uses the second connection. In the embodiment, the detecting, by the client-side proxy, that the first connection is compromised may be based on one or more of: (i) a probe of the first connection; (ii) a failure of a certificate from the destination to match a previous certificate from the destination; and (iii) a presence of one or more of an address or an identifier that is not specified in a policy for the first connection. The embodiment may further comprise: determining, by the client-side proxy before the first connection is used, whether data associated with the application on the computing device indicates that the communication will be encrypted; and the creating, by the client-side proxy before the first connection is used, the second connection to the destination may include: creating, by the client-side proxy, the second connection to the destination when the determination is that the received data indicates that the communication will be encrypted. In the embodiment, the inspecting the communication may include determining whether the communication includes predetermined content, and modifying, by the client-side proxy, the communication to send the communication using the second connection may include modifying the communication to use the second connection when the determination is that the communication includes the predetermined content.

An embodiment is directed to a method for preventing the use of a first connection, the method comprising: (i) inspecting, by a client-side proxy on a computing device, a communication from an application on the computing device to a destination, the communication configured to use the first connection to communicate with the destination, the inspecting of the communication being completed before the first connection is used; (ii) creating, by the client-side proxy before the first connection is used, a second connection to the destination; (iii) performing, by the client-side proxy before the first connection is used, a handshake with the destination using the second connection; (iv) recording, by the client-side proxy before the first connection is used, session information associated with the handshake; (v) breaking, by the client-side proxy before the first connection is used, the second connection; (vi) making, by the client-side proxy before the first connection is used, a third connection to the destination, the third connection being made using the recorded session information; and (vii) modifying, by the client-side proxy before the first connection is used, the communication so that the modified communication uses the third connection. The embodiment may further comprise: determining before the first connection is used, by the client-side proxy from the inspecting, that the first connection is to be used; detecting, by the client-side proxy before the first connection is used, that the first connection is compromised before the creating, by the client-side proxy, the second connection to the destination; and modifying, by the client-side proxy after the communication, a second communication from the application on the computing device so that the modified second communication uses the third connection. In the embodiment, the inspecting, by the client-side proxy, the communication may further include: (i) determining, by the client-side proxy, whether the communication or the first connection is subject to a policy; and (ii) performing the remaining steps of the method when the client-side proxy determines that the that the communication or the first connection is subject to the policy. In the embodiment, the policy may be based on a risk level associated with one or more of: the communication, the first connection, and the computing device. The embodiment may further comprise:

determining, by the client-side proxy before the first connection is used, whether data associated with the application on the computing device indicate that the communication will be encrypted; where the creating, by the client-side proxy before the first connection is used, the second connection to the destination may include: creating, by the client-side proxy, the second connection to the destination when the determination is that the received data indicate that the communication will be encrypted.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method for preventing the use of a first connection, the method comprising:
    (i) inspecting, by a client-side proxy on a computing device, a communication from an application on the computing device to a destination, the communication originating from the computing device and configured to use the first connection to send content to the destination, the inspecting of the communication being completed before the first connection is used and the inspecting including a determination of whether the content contains predetermined content; and
    (ii) when the determination is that the content contains the predetermined content:
    creating, by the client-side proxy before the first connection is used, a second connection, the client-side proxy creating the second connection through a server to the destination, the second connection being more secure than the first connection, and
    modifying, by the client-side proxy, the communication to use the second connection instead of using the first connection to send the content, including the predetermined content, to the destination.

2. The method of claim 1 further comprising:
    determining, by the client-side proxy from the inspecting before the first connection is used, that the first connection is to be used;
    detecting, by the client-side proxy, that the first connection is compromised before the creating, by the client-side proxy, the second connection to the destination; and
    modifying, by the client-side proxy after the communication, a second communication from the application so that the modified second communication uses the second connection.

3. The method of claim 2, wherein the detecting, by the client-side proxy, that the first connection is compromised is based on one or more of:
(i) a probe of the first connection;
(ii) a failure of a certificate from the destination to match a previous certificate from the destination; or
(iii) a presence of one or more of: an addresses, or an identifier that is not specified in a policy for the first connection.

4. The method of claim 1 further comprising:
determining, by the client-side proxy before the first connection is used, whether data associated with the application on the computing device indicates that the communication will be encrypted; and
wherein the creating, by the client-side proxy before the first connection is used, the second connection to the destination includes: creating, by the client-side proxy, the second connection to the destination when the determination is that the received data indicates that the communication will be encrypted.

5. The method of claim 1, wherein the inspecting, by the client-side proxy, the communication further includes:
(i) determining, by the client-side proxy, whether the communication or the first connection is subject to a policy; and
(ii) performing the remaining steps of the method when the client-side proxy determines that the communication or the first connection is subject to the policy.

6. The method of claim 5, wherein the policy is specified by an administrator or a user of the computing device.

7. The method of claim 5, wherein the policy determines the remaining steps of the method are to be performed based on a risk level.

8. The method of claim 7, wherein the risk level is associated with one or more of: the communication, the first connection, or the computing device.

9. The method of claim 7, wherein the risk level is based on one or more of: a geographic location of the computing device; an assessed security state of the computing device; or an assessed value of information stored on the computing device.

10. The method of claim 1, wherein the application created the first connection, wherein the determining whether the content contains predetermined content includes obtaining, by the client-side proxy from an operating system on the computing device, an identity of the application.

11. A method for preventing the use of a first connection, the method comprising:
(i) inspecting, by a client-side proxy on a computing device, a communication from an application on the computing device to a destination, the communication originating from the computing device and configured to use the first connection to send content to the destination, the inspecting of the communication being completed before the first connection is used and the inspecting including a determination of whether the content contains predetermined content; and
(ii) when the determination is that the content contains the predetermined content:
creating, by the client-side proxy before the first connection is used, a second connection to the destination, the second connection being more secure than the first connection,
performing, by the client-side proxy before the first connection is used, a handshake with the destination using the second connection,
recording, by the client-side proxy before the first connection is used, session information associated with the handshake,
breaking, by the client-side proxy before the first connection is used, the second connection,
making, by the client-side proxy before the first connection is used, a third connection to the destination, the third connection being made using the recorded session information, and
modifying, by the client-side proxy before the first connection is used, the communication so that the modified communication uses the third connection to send the content, including the predetermined content, to the destination.

12. The method of claim 11 further comprising:
determining before the first connection is used, by the client-side proxy from the inspecting, that the first connection is to be used;
detecting, by the client-side proxy before the first connection is used, that the first connection is compromised before the creating, by the client-side proxy, the second connection to the destination; and
modifying, by the client-side proxy after the communication, a second communication from the application on the computing device so that the modified second communication uses the third connection.

13. The method of claim 12, wherein the detecting, by the client-side proxy, that the first connection is compromised is based on one or more of:
(i) a probe of the first connection;
(ii) a failure of a certificate from the destination to match a previous certificate from the destination; or
(iii) a presence of one or more of: an address, or an identifier that is not specified in a policy for the first connection.

14. The method of claim 11, wherein the inspecting, by the client-side proxy, the communication further includes:
(i) determining, by the client-side proxy, whether the communication or the first connection is subject to a policy; and
(ii) performing the remaining steps of the method when the client-side proxy determines that the communication or the first connection is subject to the policy.

15. The method of claim 14, wherein the policy is based on a risk level associated with one or more of: the communication, the first connection, or the computing device.

16. The method of claim 14, wherein the policy is specified by an administrator or a user of the computing device.

17. The method of claim 16, wherein the policy determines the remaining steps of the method are to be performed based on a risk level.

18. The method of claim 17, wherein the risk level is based on one or more of: a geographic location of the computing device; an assessed security state of the computing device; or an assessed value of information stored on the computing device.

19. The method of claim 11 further comprising:
determining, by the client-side proxy before the first connection is used, whether data associated with the application on the computing device indicate that the communication will be encrypted; and
wherein the creating, by the client-side proxy before the first connection is used, the second connection to the destination includes: creating, by the client-side proxy, the second connection to the destination when the determination is that the received data indicate that the communication will be encrypted.

20. The method of claim 11, wherein the application created the first connection, wherein the determining whether the content contains predetermined content includes obtaining, by the client-side proxy from an operating system on the computing device, an identity of the application.

21. A non-transitory, computer-readable storage medium having stored thereon a plurality of instructions, which, when executed by a processor, cause the processor to:
(i) inspect, by a client-side proxy on a computing device, a communication from an application on the computing device to a destination, the communication originating from the computing device and configured to use the first connection to send content to the destination, the inspecting of the communication being completed before the first connection is used and the inspecting including a determination of whether the content contains predetermined content; and
(ii) when the determination is that the content contains the predetermined content:
create, by the client-side proxy before the first connection is used, a second connection, the client-side proxy creating the second connection through a server to the destination, the second connection being more secure than the first connection, and
modify, by the client-side proxy, the communication to use the second connection instead of using the first connection to send the content, including the predetermined content, to the destination.

22. The non-transitory, computer-readable storage medium of claim 21, the instructions further causing the processor to:
determine, by the client-side proxy from the inspecting before the first connection is used, that the first connection is to be used;
detect, by the client-side proxy, that the first connection is compromised before the creating, by the client-side proxy, the second connection to the destination; and
modify, by the client-side proxy after the communication, a second communication from the application so that the modified second communication uses the second connection.

23. The non-transitory, computer-readable storage medium of claim 22, wherein the instruction to detect, by the client-side proxy, that the first connection is compromised, is based on one or more of:
(i) a probe of the first connection;
(ii) a failure of a certificate from the destination to match a previous certificate from the destination; or
(iii) a presence of one or more of: an address, or an identifier that is not specified in a policy for the first connection.

24. The non-transitory, computer-readable storage medium of claim 21, the instructions further causing the processor to:
determine, by the client-side proxy before the first connection is used, whether data associated with the application on the computing device indicates that the communication will be encrypted; and
wherein the instruction to create, by the client-side proxy before the first connection is used, the second connection to the destination includes an instruction to: create, by the client-side proxy, the second connection to the destination when the determination is that the received data indicates that the communication will be encrypted.

25. The non-transitory, computer-readable storage medium of claim 21, wherein the instruction to inspect, by the client-side proxy, the communication further includes instructions to:
(i) determine, by the client-side proxy, whether the communication or the first connection is subject to a policy; and
(ii) perform the remaining steps of the method when the client-side proxy determines that the communication or the first connection is subject to the policy.

26. The non-transitory, computer-readable storage medium of claim 25, wherein the policy is specified by an administrator or a user of the computing device.

27. The non-transitory, computer-readable storage medium of claim 25, wherein the policy determines the remaining steps of the method are to be performed based on a risk level.

28. The non-transitory, computer-readable storage medium of claim 27, wherein the risk level is associated with one or more of: the communication, the first connection, or the computing device.

29. The non-transitory, computer-readable storage medium of claim 27, wherein the risk level is based on one or more of: a geographic location of the computing device; an assessed security state of the computing device; or an assessed value of information stored on the computing device.

30. The non-transitory, computer-readable storage medium of claim 21, wherein the application created the first connection, wherein the instruction to determine whether the content contains predetermined content includes an instruction to obtain, by the client-side proxy from an operating system on the computing device, an identity of the application.

31. A system, comprising at least one processor and memory and instructions that when executed cause the at least one processor to:
(i) inspect, by a client-side proxy on a computing device, a communication from an application on the computing device to a destination, the communication originating from the computing device and configured to use the first connection to send content to the destination, the inspecting of the communication being completed before the first connection is used and the inspecting including a determination of whether the content contains predetermined content; and
(ii) when the determination is that the content contains the predetermined content:
create, by the client-side proxy before the first connection is used, a second connection, the client-side proxy creating the second connection through a server to the destination, the second connection being more secure than the first connection, and
modify, by the client-side proxy, the communication to use the second connection instead of using the first connection to send the content, including the predetermined content, to the destination.

32. The system of claim 31, the instructions further causing the processor to:
determine, by the client-side proxy from the inspecting before the first connection is used, that the first connection is to be used;
detect, by the client-side proxy, that the first connection is compromised before the creating, by the client-side proxy, the second connection to the destination; and modify, by the client-side proxy after the communication, a second communication from the application so that the modified second communication uses the second connection.

33. The system of claim 32, wherein the instruction to detect, by the client-side proxy, that the first connection is compromised, is based on one or more of:
(i) a probe of the first connection;
(ii) a failure of a certificate from the destination to match a previous certificate from the destination; or
(iii) a presence of one or more of an address, or an identifier that is not specified in a policy for the first connection.

34. The system of claim 31, the instructions further causing the processor to:
determine, by the client-side proxy before the first connection is used, whether data associated with the application on the computing device indicates that the communication will be encrypted; and
wherein the instruction to create, by the client-side proxy before the first connection is used, the second connection to the destination includes an instruction to: create, by the client-side proxy, the second connection to the destination when the determination is that the received data indicates that the communication will be encrypted.

35. The system of claim 31, wherein the instruction to inspect, by the client-side proxy, the communication further includes instructions to:
(i) determine, by the client-side proxy, whether the communication or the first connection is subject to a policy; and
(ii) perform the remaining steps of the method when the client-side proxy determines that the communication or the first connection is subject to the policy.

36. The system of claim 35, wherein the policy is specified by an administrator or a user of the computing device.

37. The system of claim 35, wherein the policy determines the remaining steps of the method are to be performed based on a risk level.

38. The system of claim 37, wherein the risk level is associated with one or more of: the communication, the first connection, or the computing device.

39. The system of claim 37, wherein the risk level is based on one or more of: a geographic location of the computing device; an assessed security state of the computing device; or an assessed value of information stored on the computing device.

40. The system of claim 31, wherein the application created the first connection, wherein the instruction to determine whether the content contains predetermined content includes an instruction to obtain, by the client-side proxy from an operating system on the computing device, an identity of the application.

* * * * *